US007949601B2

(12) United States Patent  
Weiss et al.

(10) Patent No.: US 7,949,601 B2
(45) Date of Patent: May 24, 2011

(54) METHOD AND SYSTEM FOR PROVIDING MINIMUM CONTRACT VALUES IN AN ANNUITY WITH LIFETIME BENEFIT PAYMENTS

(75) Inventors: Joseph M. Weiss, Glastonbury, CT (US); Charles D. Tatro, Mendon, MA (US); Maria Leonard Andrade, Suffield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 162 days.

(21) Appl. No.: 12/359,088

(22) Filed: Jan. 23, 2009

(65) Prior Publication Data

US 2009/0132300 A1  May 21, 2009

Related U.S. Application Data

(63) Continuation-in-part of application No. 11/788,595, filed on Apr. 21, 2007, now Pat. No. 7,685,065.

(51) Int. Cl.
*G06Q 40/00* (2006.01)
(52) U.S. Cl. .............. 705/39; 705/4; 705/35; 705/36 R; 705/36 T
(58) Field of Classification Search ............. 705/4, 35, 705/36 R, 36 T, 37, 38, 39, 40
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,049,772 A * | 4/2000 | Payne et al. ...................... | 705/4 |
| 6,064,986 A | 5/2000 | Edelman | |
| 6,275,807 B1 | 8/2001 | Schirrpa | |
| 6,611,808 B1 | 8/2003 | Preti et al. | |
| 6,611,815 B1 | 8/2003 | Lewis et al. | |
| 6,636,834 B1 | 10/2003 | Schirrpa | |
| 6,950,805 B2 | 9/2005 | Kavanaugh | |
| 6,963,852 B2 | 11/2005 | Koresko | |
| 7,016,871 B1 * | 3/2006 | Fisher et al. ................... | 705/35 |
| 7,080,032 B2 | 7/2006 | Abbs et al. | |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,376,608 B1 * | 5/2008 | Dellinger et al. ........... | 705/36 R |
| 7,398,241 B2 | 7/2008 | Fay et al. | |
| 7,613,644 B1 | 11/2009 | Abbs et al. | |

(Continued)

OTHER PUBLICATIONS

Anonymous "Risk Management: You've Come a Long Way, Baby." Aug. 1, 2005, Annuity Market News.*

(Continued)

*Primary Examiner* — Kelly Campen
(74) *Attorney, Agent, or Firm* — Howard IP Law Group, PC

(57) ABSTRACT

A data processing method administers a deferred annuity contract during the accumulation phase for a relevant life. The annuity contract has a contract value, a guarantee of lifetime benefit payments and a minimum contract value. Administration of the contract determines a minimum contract value, while paying a lifetime benefit payment less than the minimum contract value and a guaranteed death benefit not less than the minimum contract value. The lifetime benefit payment does not reduce the contract value below the minimum contract value.

22 Claims, 7 Drawing Sheets

U.S. PATENT DOCUMENTS

| | | | |
|---|---|---|---|
| 7,624,058 | B1 | 11/2009 | Abbs et al. |
| 7,711,624 | B2 | 5/2010 | Abbott et al. |
| 2001/0014873 | A1 | 8/2001 | Henderson et al. |
| 2001/0047325 | A1 | 11/2001 | Livingston |
| 2002/0035527 | A1 | 3/2002 | Corrin |
| 2002/0100727 | A1 | 8/2002 | Corcoran |
| 2002/0174045 | A1 | 11/2002 | Arena et al. |
| 2002/0188540 | A1 | 12/2002 | Fay et al. |
| 2002/0194098 | A1 | 12/2002 | Stiff et al. |
| 2003/0088430 | A1 | 5/2003 | Ruark |
| 2003/0105652 | A1 | 6/2003 | Arena et al. |
| 2003/0120570 | A1 | 6/2003 | Dellinger et al. |
| 2003/0163402 | A1 | 8/2003 | Kincart |
| 2003/0171956 | A1 | 9/2003 | Cox et al. |
| 2003/0187764 | A1 | 10/2003 | Abbs et al. |
| 2004/0039601 | A1 | 2/2004 | Anderson |
| 2004/0039608 | A1 | 2/2004 | Mazur et al. |
| 2004/0088236 | A1 | 5/2004 | Manning |
| 2004/0172350 | A1 | 9/2004 | Atkinson et al. |
| 2004/0177022 | A1* | 9/2004 | Williams et al. ............... 705/36 |
| 2004/0181436 | A1 | 9/2004 | Lange |
| 2004/0204951 | A1 | 10/2004 | Wood et al. |
| 2004/0267647 | A1 | 12/2004 | Brisbois |
| 2005/0010453 | A1 | 1/2005 | Terlizzi et al. |
| 2005/0060251 | A1 | 3/2005 | Schwartz et al. |
| 2005/0080698 | A1 | 4/2005 | Perg et al. |
| 2005/0144103 | A1 | 6/2005 | Perg et al. |
| 2005/0144124 | A1* | 6/2005 | Stiff et al. ............... 705/39 |
| 2005/0240521 | A1 | 10/2005 | Fuentes-Torres |
| 2006/0071661 | A1 | 4/2006 | Ong |
| 2006/0074787 | A1 | 4/2006 | Perg et al. |
| 2006/0080148 | A1 | 4/2006 | Koresko |
| 2006/0085338 | A1* | 4/2006 | Stiff et al. ............... 705/40 |
| 2006/0089892 | A1 | 4/2006 | Sullivan et al. |
| 2006/0095353 | A1 | 5/2006 | Midlam |
| 2006/0111997 | A1 | 5/2006 | Abbott et al. |
| 2006/0111998 | A1 | 5/2006 | Fisher et al. |
| 2006/0143055 | A1 | 6/2006 | Loy et al. |
| 2006/0149651 | A1 | 7/2006 | Robinson |
| 2006/0155622 | A1 | 7/2006 | Laux |
| 2006/0190373 | A1 | 8/2006 | Perg et al. |
| 2006/0195375 | A1 | 8/2006 | Bohn |
| 2006/0206398 | A1 | 9/2006 | Coughlin |
| 2006/0206401 | A1 | 9/2006 | Abbs et al. |
| 2006/0212379 | A1 | 9/2006 | Perg et al. |
| 2006/0212380 | A1 | 9/2006 | Williams et al. |
| 2006/0242052 | A1* | 10/2006 | Long et al. ............... 705/35 |
| 2006/0270194 | A1 | 11/2006 | Thompson et al. |
| 2007/0011063 | A1 | 1/2007 | Shelon et al. |
| 2007/0011069 | A1 | 1/2007 | Bevacqua, Jr. |
| 2007/0011086 | A1 | 1/2007 | Dellinger et al. |
| 2007/0021986 | A1 | 1/2007 | Cheung et al. |
| 2007/0033124 | A1* | 2/2007 | Herr et al. ............... 705/35 |
| 2007/0038488 | A1 | 2/2007 | Bauer et al. |
| 2007/0078690 | A1* | 4/2007 | Kohl ............... 705/4 |
| 2007/0100715 | A1 | 5/2007 | O'Donnell et al. |
| 2007/0100720 | A1 | 5/2007 | Bonvouloir |
| 2007/0100726 | A1 | 5/2007 | O'Flinn et al. |
| 2007/0100727 | A1 | 5/2007 | Multer et al. |
| 2007/0106589 | A1 | 5/2007 | Schirripa |
| 2007/0130035 | A1* | 6/2007 | Carden ............... 705/35 |
| 2007/0162380 | A1 | 7/2007 | Conroy |
| 2007/0198352 | A1 | 8/2007 | Kannegiesser |
| 2007/0198377 | A1 | 8/2007 | Livingston et al. |
| 2007/0239572 | A1 | 10/2007 | Harris et al. |
| 2007/0244777 | A1 | 10/2007 | Torre et al. |
| 2007/0271201 | A1 | 11/2007 | Armand et al. |
| 2007/0278288 | A1 | 12/2007 | Simmons |
| 2008/0010095 | A1* | 1/2008 | Joyce ............... 705/4 |
| 2008/0071661 | A1* | 3/2008 | Jeudy et al. ............... 705/36 R |
| 2008/0189223 | A1* | 8/2008 | Baiye ............... 705/36 R |
| 2008/0270194 | A1 | 10/2008 | West et al. |

OTHER PUBLICATIONS

Anonymous "Full disclosure variable life report.( Policy Analysis )" Nov. 13, 2006, National Underwriter Life & Health , v 110 , n 43 , p. 30.*

Key to Making Retirement Savings last: The Withdrawal Rate, New York Life, www.newyorklife.com/cda/0,3254,14198,00.html. (accessed May 22, 2008).

Anonymous "Q2 2005 American EQTY INVT Life HLD Co Earnings Conference Call-Final" Aug. 4, 2005, Fair Disclosure Wire.

Shapiro et al. "Separating Annuity Buyers by Fixed Vs. Variable" Apr. 5, 1993, National Underwriter Life.Health.Financial Serviecs), V97N14 pp. 20-21.

"The Power and Protection of Income Annuities" (Empire Fidelity Investments Life Insurance Company), http://personal.fidelity.com/products/annuities/pdf/IncomeAnnuitySpecialReport.pdf.

Form 485BPOS (Apr. 26,2006), Transamerica-NewLTC-LifetimeGMWB_May2006SECFiling.pdf.

Prospectus, Penn Mutual Variable Annuity Account III, Enhanced Credit Variable Annuity; May 1, 2007.

"Glossary of Insurance Terms", Insurance Information Institute, http:www.iii.org/media/glossary (Jan. 1, 2008).

Penn Mutual Variable Annuity Account III, SEC Form 497, Filed Oct. 2, 2006.

New York Life Longevity Benefit Variable Annuity Brochure, New York Life Insurance Company, May 2007.

New York Life Longevity Benefit Variable Annuity FactSheet, New York Life Insurance Company, May 2007.

Paradis, T., More Funds Adopt Performance-Based Fees, Washingtonpost.com (Associated Press), Apr. 8, 2007.

"Facts about the New York Life Longevity Benefit Variable Annuity Product", New York Life Insurance Company, May 2007.

New York Life Longevity Benefit Variable Annuity Prospectus Amendment dated Aug. 15, 2007, New York Life Insurance Company, Aug. 2007.

S&P U.S. Indices Index Methodology, Standard & Poor's, Sep. 2007.

Blodget, H., Money for Nothing: The Real Trouble with Mutual Funds, Slate.com, Dec. 1, 2004.

"Income Select for Life"; Transamerica Financial Life Insurance Company; https://www.transamericaadvisor.com/contentServer/MediaServer? uri=/site/tciidex/media/PDF/Annuities_TCI/Client_Approved_Material/Tips_and_Techniques/.BRIS.pdf.

"Jackson Enhances Living Benefit Options within its Perspective Family of Variable Annuities"; Business Wire; Apr. 30, 2007.

"Learn the Basics about Lifetime Legacy"; http://www.americo.com/lifetirne/lifetimelegacy.html; Accessed Jan. 4, 2008.

"Accelerated Death Benefits"; http://www.medicare.gov/; Accessed Jan. 4, 2008.

"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.

"Just the Facts: The Best of America All American Gold Annuity Key Facts"; Nationwide Financial Services, Inc.; https://ssc.nwseivicecenter.com/media/pdf/product/VAM-0504A0-FLpdf.

Form N-4, Transamerica Life Insurance Company; Flexible Premium Variable Annuity-J; Separate Account VA Y; filed Feb. 22, 2006.

"Fidelity.com Glossary" (letter "p"); https://scs.fidelity.com/webxpress/help/topics/help_definition_p.shtml; Accessed Jan. 4, 2008.

Stout, R.G. et al.; "Dynamic Retirement Withdrawal Planning"; Financial Services Review 15 (2006) 117-131.

"Prudential Investments Introduces Strategic Partners Annuity One; New Variable Annuity Offers Investors World-Class Money Managers and Flexible Product Features"; Business Wire, Oct. 9, 2000.

"Retireonyourterms"; http://www.retireonyourterms.com/ glossary/GlossaryText.htm; Accessed Jan. 4, 2008.

Buckingham, B.; "Making IRAs Last a Lifetime with Annuities"; Life & Health Advisor; Mar. 2006.

"RiverSource Innovations Select Variable Annuity"; http://www.riversource.com/rvsc/global/docs/INNOV-SELECT-NY-AAG.pdf.

"Pacific Life Individual (k) Program"; https://annuities.myaccount.pacificlife.com/public/corporate/product_info/pos/guide pos_1911-07b.pdf.

The Right Rider: Boomers want guaranteed lifetime income, but don't want to buy an immediate annuity. Variable annuity issuers think they have a solution. Donald Jay Korn. Financial Planning. New York:Feb 1, 2006. p. 104-106.

Panko, Ron. New Products. Best's Review, 108(3), 24. (Jul. 2007) Retrieved Jun. 15, 2010, from ABI/INFORM Global. (Document ID: 1305708101).

Antolin, Pablo. Longevity Risk and Private Pensions. Financial Market Trends,(92), 107,109-128. (Jun. 2007) Retrieved Jun. 15, 2010, from ABI/INFORM Global. (Document ID: 1327899621).

Yates, Karen E & Liss, Stephen. Charitable Lead Annuity Trusts—A Primer. Taxation of Exempts, 19(1), 23. (Jul. 2007) Retrieved Jun. 15, 2010, from Accounting & Tax Periodicals. (Document ID: 1303194511).

Harshman, Scott & Schaller, Gordon. Private Annuities: An Income Tax Deferral Technique. Orange County Business Journal, 29(39), A56-A57. (Sep. 2006) Retrieved Jun. 15, 2010, from Business Dateline. (Document ID: 1223536121).

Scudder Investments Introduces Two New Variable Annuity Products with Travelers Life & Annuity, Jun. 9, 2003, PR newswire, pp. 1-4.

American Skandia Life Assurance Corpt/CT, publisher: Edgar Online, dated Dec. 31, 2007.

* cited by examiner

METHOD AND SYSTEM FOR PROVIDING MINIMUM CONTRACT VALUES IN AN ANNUITY WITH LIFETIME BENEFIT PAYMENTS

CROSS-REFERENCE TO RELATED APPLICATIONS

This application is a continuation-in-part of U.S. patent application Ser. No. 11/788,595, filed Apr. 21, 2007.

BACKGROUND OF THE INVENTION

1. Field of the Invention

The present invention relates to a method and system for providing minimum contract values in an annuity with lifetime benefit payments; and more particularly, to a data processing method for administering an annuity contract for a relevant life, the annuity contract having a contract value, a minimum contract value, and a guarantee of lifetime benefit payments.

2. Description of the Prior Art

An immediate annuity is typically used to provide an income stream within a predetermined length of time from the date the premium is received. The amount of income can be either fixed or variable in nature and typically these products do not provide an account value. A deferred annuity is typically used to provide accumulation and, potentially, a future stream of annuity income. The deferred annuity comprises an accumulation period during which the account value will vary with the underlying investments and an annuitization period where the client purchases an immediate annuity with the account value available. Deferred and immediate annuities typically provide guaranteed income for life, which transfers some portion or all of the risk of outliving one's accumulated assets to the insurer.

One basis for distinguishing commonly available deferred annuities is whether the annuity is classified as a "fixed annuity" or a "variable annuity."

In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee." The rate credited on a fixed annuity is reset periodically, moving in an amount and a direction that correlate the yields available on fixed-income investments available to the insurer.

With a variable annuity, the annuity contract owner bears the investment risk. The relevant life typically has a choice of funds in which he/she can direct where the annuity deposits will be invested. The various funds, or sub-accounts, may include stocks, bonds, money market instruments, mutual funds, and the like.

Variable annuity contracts typically provide a death benefit. Oftentimes, during the accumulation period, this death benefit is related to the contract value. That is, if the sub-accounts backing the contract value have performed poorly, then the death benefit may be reduced to an insignificant amount. After annuitization, the death benefit can be a function of the remaining payments of the annuity at the time of the relevant life's death. Further, if the annuity contract does not provide a guarantee (GMIB, GMWB, etc.), the contract will terminate when the contract value goes to zero or some other amount specified in the contract or rider.

Annuity contracts may also provide guarantees in several different variations. A Guaranteed Minimum Death Benefit (GMDB) is a guarantee that provides a minimum benefit at the death of the relevant life regardless of the performance of the underlying investments. A Guaranteed Minimum Income Benefit (GMIB) is a guarantee that will provide a specified income amount at the time the contract is annuitized. The income payment will be dependent on previously stated details set out in the contract. A Guaranteed Minimum Accumulation Benefit (GMAB) is a benefit that guarantees a specified contract value at a certain date in the future, even if actual investment performance of the contract is less than the guaranteed amount. A Guaranteed Minimum Withdrawal Benefit (GMWB) is a guarantee of income for a specified period of time, and in some versions the income stream is guaranteed for life without requiring annuitization as in the guaranteed minimum income benefit. However, this guarantee will automatically annuitize the contract if the contract value is reduced to zero or some other amount specified in the contract or rider.

There remains a need in the art for a data processing method for administering an annuity contract for a relevant life wherein the annuity contract has a guarantee of lifetime benefit payments. In addition, there is needed a data processing method wherein the annuity contract is designed to maintain a minimum contract value while continually paying lifetime benefit payments wherein the minimum contract value helps to prevent the contract value from otherwise being reduced to zero or below another stated amount in the contract or rider which, in that case, would require the contract to annuitize in order to continue lifetime payments.

In addition, there is needed an annuity contract wherein, if necessary, the lifetime benefit payments are funded by the general account assets of the company that issues the annuity contract, rather than from the contract value, in order to help prevent the contract value from being reduced to zero or below another stated amount in the contract or the rider.

SUMMARY OF THE INVENTION

The present invention provides a data processing method for administering a deferred annuity contract during the accumulation phase for a relevant life wherein the annuity contract has a guarantee of lifetime benefit payments. Administration is such that the annuity contract maintains or guarantees a minimum contract value regardless of the amount of income received as long as the income has been received according to the contract or rider rules contained herein. By maintaining or guaranteeing a minimum contract value, the annuity contract provides a death benefit even if the guaranteed death benefit is at or near zero at the time of the relevant life's death. In prior art annuity contracts, the contract value and death benefit could be depleted by continuing to receive lifetime benefit payments, but by insulating the contract value from withdrawals when it falls to the minimum contract value, the present invention includes a minimum contract value, and similarly a death benefit, that are maintained or guaranteed.

The data processing method and system of the invention maintains or guarantees a minimum contract value in an annuity with lifetime benefit payments. The data processing method administers an annuity contract having a contract value, together with a guarantee of lifetime benefit payments and the maintenance or guarantee of a minimum contract value.

Generally stated, the method of the invention determines a payment base for the annuity contract that is a function of the previous premium payments and withdrawals by the relevant life, and could include investment performance on an annual or other basis (daily, monthly, etc.). The method determines a minimum contract value (MCV) for the annuity contract. The MCV may be determined via a number of methods including but not limited to the following formulas:

MCV=(a predetermined percentage)×(the payment base);

MCV=(a predetermined percentage)×(the total premium).

The method also determines a guaranteed death benefit amount. During the accumulation phase the system performs the following steps: (i) if requested by the relevant life, periodically accepting premium payments from the relevant life which, increase the payment base, the guaranteed death benefit amount, and the contract value; (ii) determining a withdrawal percent; (iii) if requested by the relevant life, or if other defined criteria are reached, periodically paying a guaranteed lifetime benefit payment withdrawal to the relevant life from the contract value, which decreases both the contract value and the guaranteed death benefit amount, but will not decrease the contract value below the minimum contract value, wherein the guaranteed lifetime benefit payment is determined by any of the following formulas:

Lifetime Benefit Payment (LBP) withdrawal=(the payment base)×(the withdrawal percent);

Lifetime Benefit Payment (LBP) withdrawal=(the total premium)×(the withdrawal percent);

and (iv) if requested by the relevant life, periodically paying a withdrawal payment that is in excess of the lifetime benefit payment to the relevant life from the contract value, which decreases each of: the contract value, the payment base, and the death benefit amount, and can decrease the contract value below the minimum contract value. Upon the death of the relevant life, the present method pays a death benefit to a beneficiary, wherein the death benefit is the greater of: (a) the guaranteed death benefit amount; and (b) the present contract value.

In one aspect of the invention, the annuity contract of the data processing method is a deferred variable annuity. In another aspect of the invention, the annuity contract of the data processing method is a deferred variable annuity and further includes sub-accounts whose market performance can cause the contract value to decrease below the minimum contract value. In other aspects of the invention, the annuity contract may be selected from the group of fixed, combination variable/fixed, and equity indexed annuities.

In one aspect of the invention, the predetermined percentage that is used to calculate the minimum contract value is 20%. The predetermined percentage may be any percentage between 0% and 100%. Preferably, the deferred variable annuity of the present invention has a maximum annuity commencement date that is the later of the $10^{th}$ contract anniversary and the date the relevant life reaches age 90. If the method of the present invention is in the form of a rider, then the administration of the annuity contract for the relevant life further comprises the step of: collecting a rider fee. Alternatively, the data processing method for administering an annuity contract for a relevant life further comprises the step of: collecting a rider fee only if the current contract value is greater than the minimum contract value; or, in other words, ceasing collection of the rider fee if the current contract value is less than the minimum contract value.

The data processing method for administering an annuity contract for a relevant life can further comprise the step of: collecting an account maintenance fee. Alternatively, the data processing method for administering an annuity contract for a relevant life can further comprise the step of: collecting an account maintenance fee only if the current contract value is greater than the minimum contract value; or, in other words, ceasing collection of the account maintenance fee if the current contract value is less than the minimum contract value.

In addition, the account may be subject to M, E & A, 12 b-1 and fund level charges. These charges may or may not be assessed against the contract value if the contract value is below the minimum contract value.

The guaranteed death benefit is paid to the beneficiary only if the relevant life dies during the accumulation phase. However, a guaranteed death benefit may also be payable during annuitization as well. The lifetime benefit payment may be determined by the following formula:

LBP=the greater of:

"the guaranteed lifetime benefit payment"−(the Payment Base)×(the Withdrawal Percent); and (i)

"the maximum lifetime benefit payment"−(the present Contract Value)×(the Withdrawal Percent). (ii)

The lifetime benefit payment may be paid once yearly or periodically throughout the year; however, there is a maximum lifetime benefit payment for any given year. If the contract value would be equal to or less than the minimum contract value, then the guaranteed lifetime benefit payment is paid out of the general account assets of the company issuing the annuity contract, and the contract value is not decreased. This feature is an added benefit that provides the relevant life with flexibility and control by continuing to have a contract value, and provides the opportunity to continue to grow that value through investment performance. In prior art annuity contracts, the relevant life loses any asset control once the contract value drops to a minimum contract value amount under the annuity rules because, at that time, the contract would either terminate or annuitize.

In one aspect, the value of the annuity payments, if necessary, equals the value of the last guaranteed lifetime benefit payment. In other aspects, excess withdrawals, Required Minimum Distributions or step-ups could cause the value of the annuity payments or guaranteed lifetime benefit payments to change.

In another aspect of the invention, there is provided a data processing method for administering an annuity contract for a relevant life, the annuity contract having a contract value and a guarantee of lifetime benefit payments and a minimum contract value, comprising the steps of: (i) establishing a minimum contract value; (ii) paying a lifetime benefit payment; and (iii) maintaining a death benefit.

The invention can comprise an annuity contract having: (i) means for establishing a minimum contract value; (ii) means for paying a lifetime benefit payment; and (iii) means for maintaining a death benefit. It can also comprise an annuity contract having means for insulating a minimum contract value from the effect of withdrawal payments, lifetime benefit rider fees or other dollar-based charges.

In yet another aspect of the invention, there is provided a data processing method for administering an annuity contract for a relevant life, the annuity contract having a contract value, a guarantee of lifetime benefit payments and the maintenance or guarantee of a minimum contract value, comprising the steps of: (i) determining a payment base for said annuity contract; and (ii) determining a minimum contract value (MCV) for said annuity contract that is determined by the following formula:

MCV=(a predetermined percentage)×(the payment base).

This formula could also be applied to the premium in another embodiment.

The present invention solves several of the problems associated with the conventional administration of annuity contracts. Maintenance of a minimum contract value aids a relevant life's recovery from low or negative-yield investments. The relevant life is afforded increased security by maintenance of a lifetime benefit payment, a death benefit, and liquidity in the form of a minimum contract value during hardship. If the contract value falls to the minimum contract value, the present invention provides the relevant life with added benefits of maintaining a death benefit, providing continued flexibility of investments, potential relief from paying contract fees, and maintaining control of assets instead of annuitizing the contract.

Other objects, features, and characteristics of the present invention, as well as the methods of operation and functions of the related elements of the structure, and the combination of parts and economies of manufacture, will become apparent upon consideration of the following detailed description with reference to the accompanying drawings, all of which form a part of this specification.

BRIEF DESCRIPTION OF DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DESCRIPTION OF THE PREFERRED EMBODIMENTS

Figure 1:
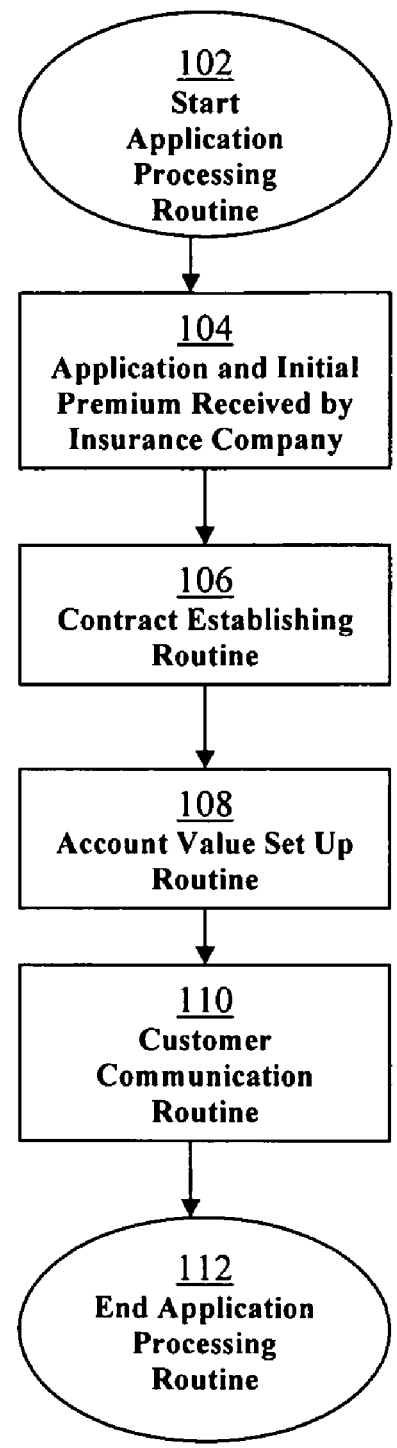
FIG. 1 is a flow chart illustrating the manner in which a new annuity contract application is processed.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. They are deemed to afford the best embodiment for purposes of disclosure; but should not be construed as limiting the scope of the invention. The following presents a detailed description of the preferred embodiment of the present invention.

The present invention comprises a data processing method for administering an annuity contract having a guarantee of lifetime income and a minimum contract value that never reaches a zero value. (The only way for the minimum contract value to reach zero is if the funds backing the sub-accounts become valueless, or if the relevant life takes withdrawals in excess of the lifetime benefit payment.) The present data processing method is preferably in the form of a rider to a variable annuity contract wherein the rider provides that the relevant life has a minimum contract value. In another aspect of the invention, the present data processing method is not in the form of a rider, but is a part of the base contract. In exchange for paying higher fees, the relevant life receives several advantages by selecting the method and system of the present invention, which provides a minimum contract value. These advantages include the following discussed infra.

First, the relevant life will sustain a death benefit. The death benefit provision, in accordance with the present invention, guarantees that upon death of the relevant life, a death benefit (DB) will be paid to a beneficiary named in the contract. That death benefit payment will be equal to the greater of: (i) the guaranteed death benefit; and (ii) the contract value as of the date the annuity company receives proof of death. Typically, receiving income payments reduces the death benefit on the contract by reducing the guaranteed death benefit as well as the contract value. However, if the contract value is at or below the minimum contract value, then the contract value is no longer reduced when receiving income payments, and therefore the death benefit is "protected" and will still be there when it typically would have otherwise been exhausted. Further, in one embodiment of the present invention, the minimum contract value is guaranteed, such that the guaranteed death benefit would never fall below the minimum contract value.

Second, compared to prior art methods, the relevant life may receive lifetime benefit payments that continue for a longer period of time prior to the "annuitization period". Some prior art methods force annuitization when the contract value drops down to minimum contract rules. If the contract did not annuitize, it could possibly terminate without value. Under the present invention, once the contract value reaches the minimum contract value, the income payments no longer reduce the contract value upon each withdrawal, and therefore the contract value can be maintained or guaranteed for a longer period of time. This would allow the relevant life to maintain additional control over the contract and the investments within the contract.

Third, if applicable, the rider fee and account maintenance fee are waived if the contract value falls below the minimum contract value. Therefore, by waiving the fees, this feature is an additional method of maintaining or guaranteeing a minimum contract value. This reduces the cost of the contract for the relevant life.

Fourth, it facilitates potential recovery of the contract value after a sustained period of poor investment returns by allowing the contract value the chance to rebound and increase above the minimum contract value. For example, if the investments in the contract experience enough positive growth, the contract value has an opportunity to increase above the minimum contract value. This would not have been possible if the minimum contract value did not prevent fees and income payments from reducing the contract value once it reaches the minimum contract value.

The present invention comprises a data processing method for administering an annuity contract for a relevant life, the annuity contract having a contract value and a guarantee of lifetime benefit payments and a minimum contract value, comprising the steps of: (i) establishing a minimum contract value; (ii) paying a lifetime benefit payment; and (iii) maintaining a death benefit. The lifetime benefit payment does not reduce the contract value below the minimum contract value. If necessary, the lifetime benefit payment is funded by the general account assets of the company that issues the annuity contract.

The following definitions are given hereunder to better understand terms used in the specification.

"Relevant Life" or "Covered Life": The term relevant life or covered life is the governing life for determination of the living benefits provided under this illustrative embodiment. Covered life (or relevant life) may refer to any one or more of the following: an owner, joint owner, annuitant, joint annuitant, co-owner, co-annuitant or beneficiary.

"Minimum Contract Value": A predetermined percentage (preferably 20%, but can be any other pre-selected percentage) of the relevant life's Payment Base or premium on the date of a withdrawal request. It should be understood that in other embodiments of the present invention, other formulas may be utilized for determining the minimum contract value.

"Withdrawal Base": The withdrawal base is the amount used in one embodiment of the present invention to determine the lifetime benefit payment. Preferably, the withdrawal base may be equal to the amount of the original premium, the payment base value, the contract value, or the greater of the payment base value and the contract value.

"Payment Base": The payment base (PB) (or more accurately the payment base value) is the amount used in one embodiment of the present invention to determine the lifetime benefit payment and the rider charge. In one embodiment of the present invention, the initial payment base value equals the initial premium.

"Premium": 100% of the dollar amount of the initial or subsequent premium payments deposited into the contract before application of any sales charges or payment enhancements.

"Withdrawal Request": A request made by the relevant life to withdraw funds during the "accumulation phase" of the contract. One type of withdrawal is a lifetime benefit payment. Any withdrawal that is in excess of the lifetime benefit payment may: (i) decrease the contract value below the minimum contract value; (ii) decrease the payment base value; and (iii) decrease the guaranteed death benefit.

"Lifetime Benefit Payment": A benefit payment that is available until the death of the relevant life. The lifetime benefit payment may be paid yearly in one embodiment. The total lifetime benefit payment for the year may also be distributed monthly, quarterly or any other defined period. Preferably, the lifetime benefit payment is only available if the covered life age is 60 (or other predetermined age) or older. Preferably, if the relevant life is age 59 (or other predetermined age) or younger, the LBP is equal to zero. Other age restrictions can also be utilized for the lifetime benefit payment. Preferably, the lifetime benefit payment is determined by the following formula:

LBP=the greater of:

"the guaranteed lifetime benefit payment"(the payment base value)×(the withdrawal percent); and "the maximum lifetime benefit payment"(the present contract value)×(the withdrawal percent).

It should be understood that in other embodiments of the present invention, other formulas may be utilized for determining the lifetime benefit payment.

"Contract Value": The contract value (CV) is a numerical measure of the relative worth of a variable annuity product during the accumulation phase. The contract value is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the contract value.

"Sub-account": Variable account investments within the variable annuity contract, such as mutual funds, stocks and bonds.

"Withdrawal": Also known as a "surrender", a relevant life may withdraw up to the contract value at any time.

"Death Benefit": The death benefit provision guarantees that upon the death of the relevant life a death benefit (DB) is paid to a beneficiary named in the contract that is equal to the greater of the guaranteed death benefit or the contract value as of the date that proof of death is received. It should be understood that in other embodiments of the present invention, other formulas may be utilized for determining the guaranteed death benefit.

"AMF": Annual Maintenance Fee.

"Annuity Commencement Date": The annuity commencement date (ACD) is the date upon which the contract enters the "annuitization phase".

"Withdrawal Percent": In one embodiment of the present invention, the withdrawal percent (WP) is used to determine the amount of the lifetime benefit payment. It should be understood that in other embodiments of the present invention, other formulas may be utilized for determining the lifetime benefit payment.

"PB increase": Payment Base increase.

"Step-Up": An increase to the payment base value that is available if the contract value increases because of favorable performance of the underlying investments. Preferably, the step-up is guaranteed at a predetermined percentage.

"High Water Mark": A predetermined threshold. In one embodiment, the high water mark is equal to the previously highest contract value (minus the rider fee) as determined at periodic time intervals.

"Partial Surrender": Partial surrender means the gross amount of the partial surrender and will include any applicable contingent deferred sales charges.

"Covered Life Change": Any contractual change before ACD which causes a change in the covered life will result in a reset in the benefits provided under the rider and allows the issuing company to impose the fund allocation restrictions.

"Annuity Contract": The term annuity contract means a set of rules and other data that are reflected in a computer processing system for operations of the annuity product.

"Issue Rules": The issuance of a contract may be subject to established requirements known as issue rules.

The following detailed illustrative embodiment(s) is presented to provide a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

Covered Life in Single and Joint/Spousal Election(s)

The covered life, or relevant life, may have a single life election or joint/spousal continuation election as described more fully herein.

Single Life Election:

If a natural owner, the covered life is the owner and the joint owner (if any) on the contract or rider effective date. If a non-natural owner—the covered life is the annuitant on the contract or rider effective date. All age-contingent benefit provisions are based on the attained age of the oldest covered life.

Joint/Spousal Continuation Election:

If a natural owner—the covered life is both the spouses (as defined by Federal Law). All age-contingent benefit provisions are based on the attained age of the youngest covered life.

Issues Rules

Issue rules are set forth to provide a more complete understanding of one illustrative embodiment of the present invention. It should be understood by those skilled in the art that these issue rules are set forth for illustrative purposes only and that other rules may be utilized. Accordingly, the issue rules set forth below should not be construed as limiting the scope of the invention.

The issue rules may include a maximum issue age. Benefit option 1 is where the riders are not available if any covered life or annuitant is age 81 (or other predetermined age) or greater on the rider effective date. For benefit option 2, these riders are not available if any covered life or annuitant is age 76 (or other predetermined age) or greater on the rider effective date. The rider may be elected on contract issue or post-issue.

Single Life Election: No additional requirements

Joint/Spousal Continuation Election: (this May Also Include Co-Annuitants)

One of the following must apply:

If a natural owner purchases joint/spousal election, and adds a spousal joint owner, then the owner can name anyone else as the designated beneficiary because by contract disposition, the joint owner will receive the death benefit.

If a natural owner purchases joint/spousal election, and does not add a joint owner, then the owner must name their spouse as the designated beneficiary.

If a non-natural owner purchases joint/spousal election, then the annuitant's spouse must be the designated beneficiary.

A joint owner who is not the owner's spouse is not allowed.

Calculation of the Withdrawal Percent (WP)

The Withdrawal Percent (WP) is used to determine the amount of the lifetime benefit payment. The WP is determined at the later of: the attained age of the covered life on the most recent contract anniversary prior to the first withdrawal, or the contract anniversary immediately following the covered life's 60$^{th}$ birthday (or other predetermined age). Below is a brief summary of the WP for single life election and joint/spousal continuation election.

Single Life Election: (Note: the following percentages and ages, if ages are in fact used, can vary)
  5.0% for attained ages 60 to 64;
  5.5% for attained ages 65 to 69;
  6.0% for attained ages 70 to 74;
  6.5% for attained ages 75 to 79;
  7.0% for attained ages 80 and above.
Joint/Spousal Continuation Election:
  4.5% for attained ages 60 to 64;
  5.0% for attained ages 65 to 69;
  5.5% for attained ages 70 to 74;
  6.0% for attained ages 75 to 79;
  6.5% for attained ages 80 and above.

Calculation of the Payment Base (PB)

The Payment Base (PB) (or more accurately payment base value) is the amount used to determine the lifetime benefit payment (LBP) and the rider charge. A total partial surrender amount in a contract year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents.

The maximum PB is $5,000,000. If the rider is effective on the contract issue date, then the PB equals the X % of the initial premium. If the rider is effective after the contract issue date, then the PB equals 100% of the dollar amount of the contract value on the rider effective date, less any payment enhancements received in the last 12 months. When subsequent premium payments are received, the PB will be increased by 100% of the dollar amount of the subsequent premium payment.

Whenever a partial surrender is made prior to the contract anniversary immediately following the covered life's 60$^{th}$ birthday (or other predetermined age), the payment base is reduced for an adjustment defined below. The threshold is 5% single/4.5% joint/spousal multiplied by the greater of the payment base or contract value at the beginning of the contract year plus subsequent premiums prior to a partial surrender. For cumulative partial surrenders during each contract year that are equal to or less than the threshold, the adjustment is equal to the dollar amount of the partial surrender. For any partial surrender that first causes cumulative partial surrenders during the contract year to exceed the threshold, the adjustment is the dollar amount of the partial surrender that does not exceed the threshold. For the portion of the withdrawal that exceeds the threshold, the adjustment is a factor. The factor is as follows:

$$1-(A/(B-C)) \text{ where}$$

$$A = \text{partial surrenders during the contract year in excess of the threshold;}$$

$$B = \text{contract value immediately prior to the partial surrender; and}$$

$$C = \text{the threshold, less any prior partial surrenders during the contract year. If C results in a negative number, C becomes zero.}$$

For partial surrenders during each contract year, where the sum of prior partial surrenders are in excess of the threshold, the adjustment is a factor. The factor is applied to the payment base immediately before the surrender. The factor is as follows:

$1-(A/B)$ where

A=the amount of the partial surrender; and

B=contract value immediately prior to the partial surrender.

Whenever a partial surrender is made on or after the contract anniversary immediately following the covered life's $60^{th}$ birthday (or other predetermined age), the PB will be equal to the amount determined as follows:

If the total partial surrenders since the most recent contract anniversary are equal to or less than the current lifetime benefit payment (LBP), the PB is not reduced by the amount of the partial surrender.

If the total partial surrenders since the most recent contract anniversary are more than the current LBP, but all partial surrenders were paid under the Automatic Income Required Minimum Distribution (AI RMD), the PB is not reduced by the amount of partial surrender.

For any partial surrender that first causes cumulative partial surrenders during the contract year to exceed the current LBP, and the AI RMD exception above does not apply, the adjustment is a factor. The factor is as follows:

$1-(A/(B-C))$ where

A=partial surrenders during the contract year in excess of the LBP;

B=contract value immediately prior to the partial surrender; and

C=the LBP, less any prior partial surrenders during the contract year. If C results in a negative number, C becomes zero.

For additional partial surrender(s) in a contract year, where the sum of all prior partial surrenders exceed the current LBP, the PB will be reduced by applying a factor. The factor is as follows:

$1-(A/B)$ where

A=the amount of the partial surrender; and

B=contract value immediately prior to the partial surrender.

Benefit Increase Provision
Benefit Option 1

The withdrawal percent will be set at the attained age of the first withdrawal and will not increase thereafter.

Benefit Option 2

The benefit increase is facilitated through an increase in the payment base. On every contract anniversary up to and including the contract anniversary immediately following the covered life's $80^{th}$ birthday (or other predetermined age), whether an increase in the PB is applicable will be automatically determined. If an increase is applicable, the PB will be automatically increased by the factor below, subject to a minimum of zero and a maximum of 10% (note: the percentage could change or it could be a full step up (no limit)):

(contract value prior to rider charge taken on current anniversary/maximum contract value)−1 where the maximum contract value equals the greater of (A) or (B) below:

(A) the contract value on the rider effective date, plus premiums received after the rider effective date; or (B) the contract value on each subsequent contract anniversary, excluding the current contract anniversary plus premiums received after the contract anniversary date. (Similar to MAV except that there is no adjustment for withdrawals.)

The WP is locked in on the date of the first withdrawal.

Calculation of the Lifetime Benefit Payment

The Lifetime Benefit Payment (LBP) is available until the death of any covered life or until the withdrawal benefit is revoked.

A total partial surrender amount in a contract year that exceeds the LBP by not more than $0.12 (the "tolerance amount") will be deemed not more than the LBP. This provision recognizes that owners may take the LBP in installments over the year, and the amount of installment may round the proportional distribution amount to the higher cent. Therefore, owners intending to stay within the LBP may exceed it by only a few cents. On the rider effective date:

If the covered life is age 60 (or other predetermined age) or older on the rider effective date, the LBP is equal to the payment base multiplied by the WP for the covered life's attained age.

If the covered life is age 59 (or other predetermined age) or younger on the rider effective date, the LBP is equal to zero.

On any contract anniversary immediately following the covered life's $60^{th}$ birthday (or other predetermined age), the LBP is equal to the WP multiplied by the greater of payment base or the contract value on the anniversary for both the age-based and the market-based riders, single and spousal. The LBP can fluctuate year to year due to market performance, but will never be lower than the WP multiplied by the PB as long as the covered life has reached the age of 60 (or other predetermined age). Also, if the account value on the anniversary exceeds the PB, the LBP may decrease in future years but will never be less than the PB multiplied by the WP.

When a subsequent premium payment is made after the contract anniversary immediately following the covered life's $60^{th}$ Birthday (or other predetermined age), the LBP is equal to the greater of: (i) the WP, on the most recent contract anniversary, multiplied by the greater of the PB or contract value immediately after the subsequent premium is received, or (ii) the prior LBP.

Whenever a partial surrender is made on or after the contract anniversary immediately following the covered life's $60^{th}$ birthday (or other predetermined age), if the PB is zero due to withdrawals, the LBP is equal to zero. During the deferral stage, subsequent premiums may be made to re-establish the PB and the LBP. The LBP will be equal to the amount determined in either one as follows:

If the total partial surrenders since the most recent contract anniversary are equal to or less than the current lifetime benefit payment (LBP), the LBP is equal to the LBP immediately prior to the partial surrender.

If the total partial surrenders since the most recent contract anniversary are more than the current LBP, but all partial surrenders were paid under the Automatic Income Required Minimum Distribution (AI RMD), the provisions of above will apply.

If the total partial surrenders since the most recent contract anniversary are more than the current LBP and the AI RMD exception above does not apply, the LBP is reset to the WP on the most recent contract anniversary multiplied by the greater of the PB or contract value immediately after the partial surrender.

The contract owner may request an amount less than, equal to, or greater than the lifetime benefit payment. Total partial surrenders taken during a contract year on or after the contract anniversary immediately following the covered life's $60^{th}$ birthday (or other predetermined age) which exceed the LBP may reduce future LBP values and may reduce the PB. If the total amount requested by the contract owner during a contract year is less than the lifetime benefit payment, the excess cannot be carried over to increase future years' lifetime benefit payments.

Contingent Deferred Sales Charge (CDSC)—Free Up to the Amount of the LBP

If the LBP exceeds the actual withdrawal amount (AWA) on the most recent contract anniversary, any contingent deferred sales charge (CDSC) will be waived up to the LBP amount.

Death Benefit Before Annuity Commencement Date

For both single and joint/spousal election, a death benefit may be available on the death of any owner or annuitant. For joint/spousal election only, no death benefit will be available when a covered life is the beneficiary, and the beneficiary dies. The death benefit provision guarantees that upon death, a death benefit (DB) equal to the greater of the death benefit or the contract value will be paid as of the date proof of death is received. The rider charge is not assessed on death. When proof of death is processed, the contract will go into suspense mode. No charges will apply during that period. The amount available to be paid as a death benefit under the terms of the rider is a return of the premium adjusted for subsequent premium payments and partial surrenders.

If the rider is effective on the contract issue date, then the DB equals the initial premium. If the rider is effective after the contract issue date, then the DB equals 100% of the dollar amount of the contract value on the rider effective date, less any bonus payments paid into the contract by the company in the last twelve months. When a subsequent premium payment is received, the DB will be increased by 100% of the dollar amount of the subsequent premium payment.

If the withdrawal feature is revoked, all future withdrawals from the death benefit will be fully proportional as of the date it is revoked.

Whenever a partial surrender is made prior to the contract anniversary immediately following the covered life's $60^{th}$ birthday (or other predetermined age), the death benefit is reduced for an adjustment defined below. (For "threshold" definition, please see "Calculation of the Payment Base" at page 19). For cumulative partial surrenders during each contract year that are equal to or less than the threshold, the adjustment is the dollar amount of the partial surrender. For any partial surrender that first causes cumulative partial surrenders during the contract year to exceed the threshold, the adjustment is the dollar amount of the partial surrender that does not exceed the threshold and the adjustment for the remaining portion of the partial surrender is a factor. The factor is applied to the portion of the death benefit that exceeds the threshold. The factor is as follows:

$1-(A/(B-C))$ where

A=partial surrenders during the contract year in excess of the threshold;

B=contract value immediately prior to the partial surrender; and

C=the threshold less any prior partial surrenders during the contract year. If C results in a negative number, C becomes zero.

For partial surrenders during each contract year, where the sum of the prior partial surrenders in the year are in excess of the threshold, the adjustment is a factor. The factor is applied to the adjusted death benefit immediately before the surrender. The factor is as follows:

$1-(A/B)$ where

A=the amount of the partial surrender; and

B=contract value immediately prior to the partial surrender.

Whenever a partial surrender is made on or after the contract anniversary immediately following the covered life's $60^{th}$ birthday (or other predetermined age), the DB will be equal to the amount determined as follows:

If the total partial surrenders since the most recent contract anniversary are equal to or less than the current lifetime benefit payment (LBP), the DB becomes the DB immediately prior to the partial surrender, less the amount of partial surrender, less the amount of partial surrender paid out of the general account of the company.

If the total partial surrenders since the most recent contract anniversary are more than the current LBP, but all partial surrenders were paid under the Automatic Income RMD (AI RMD), the DB becomes the DB immediately prior to the partial surrender, less the amount of partial surrender, less the amount of partial surrender paid out of the general account of the company.

If the total partial surrenders since the most recent contract anniversary exceed the total current LBP and the AI RMD exception does not apply, the adjustment is the dollar amount of the partial surrender that does not exceed the LBP, and the adjustment for the remaining portion of the partial surrender is a factor. The factor is applied to the portion of the death benefit that exceeds the LBP. The factor is as follows:

$1-(A/(B-C))$ where

A=partial surrenders during the contract year in excess of the LBP;

B=contract value immediately prior to the partial surrender; and

C=LBP less any prior partial surrenders during the contract year. If C results in a negative number, C=zero.

For partial surrenders during each contract year, where the sum of the prior partial surrenders in the year are in excess of the current LBP, the adjustment is a factor. The factor for adjustments for partial surrenders for the death benefit is applied to the adjusted death benefit immediately before the surrender. The factor is as follows:

$1-(A/B)$ where

A=the amount of the partial surrender; and

B=contract value immediately prior to the partial surrender.

Contract Value (CV) Reduces Below Minimum Contract Value (MCV) Rules

The minimum contract value (MCV) rules are an optional feature of the present invention and do not apply to the preferred embodiments. If the MCV rules are selected to be applied, then the following rules are used. The MCV is defined as 20% or some other percentage of the relevant life's payment base on the date of a withdrawal request. Lifetime benefit payments (LBP) cannot reduce the contract value (CV) below this minimum threshold. Only sub-account performance and withdrawals in excess of the LBP can decrease the CV below the MCV.

If total partial surrenders since the most recent contract anniversary are less than or equal to the difference between the CV and the MCV, the CV will be reduced by the total partial surrender. If the CV at the time of a partial surrender is less than or equal to the MCV, the CV will not be decreased for the partial surrender. The requested partial surrender will be paid out of the general account assets of the company. If the CV immediately before the partial surrender is greater than the MCV, but would drop below the MCV after the partial surrender, the CV will be liquidated to pay the LBP only to the extent it would equal the MCV. The remaining portion of the LBP that is not funded by the CV will be paid out of the general account assets of the company.

Covered Life Change(s)

A covered life change is any contractual change before the ACD which causes a change (defined infra) in the covered life that will result in a reset in the benefits provided under the rider and allows the imposition of the fund allocation restrictions. Covered life changes in the first 6 months of the contract issue date (or other time period) will not cause a change in the DB or PB. However, the WP and LBP may change based on the attained age of the covered life after the covered life change.

If the covered life is changed and a withdrawal has been taken, both within the first 6 months from contract issue date (or other time period), then the LBP and WP will be calculated at the time of the covered life change and will be based on the new covered life's attained age on the rider effective date. If the covered life is changed and a withdrawal has not been taken, both within the first 6 months from contract issue date (or other time period), then the LBP and WP will be calculated upon the first withdrawal as follows:

If the first withdrawal is after the first six (6) months and before the first contract anniversary (or other time period), then the LBP and WP will be based on the new covered life's attained age on the rider effective date.

If the first withdrawal occurs after the first contract anniversary, then the LBP and WP will be calculated based on the new covered life's attained age on the most recently attained contract anniversary.

If the oldest covered life after the change is greater than the age limitation of the rider at the time of the change, then the rider will terminate and the death benefit will be equal to the contract value.

Single Life Election:

Covered life changes after the first six (6) months of contract issue date will cause a reset in the benefits listed below.

If the oldest covered life after the change is equal to or less than age limitation of the rider at the time of the change, then either of the following will automatically apply.

If the rider is not currently available for sale, the withdrawal feature of the rider will be revoked.
The existing rider will continue with respect to the death benefit only.
The death benefit will be recalculated to the lesser of contract value or the DB on the effective date of the covered life change.
The rider charge is assessed on the revocation date, and then will no longer be assessed.

If the rider is currently available for sale, the existing rider will continue with respect to all benefits, at the current rider charge.
The PB will be reset to the minimum of the contract value or the PB on the date of the change.
The DB will be reset to the minimum of the contract value or the DB on the date of the change.
The WP and LBP will be recalculated on the date of the change and will be based on:
If withdrawals are taken prior to the first contract anniversary, the new covered life's attained age on the rider effective date will be used.
If withdrawals are taken after the first contract anniversary, the new covered life's attained age on the contract anniversary prior to the first withdrawal will be used.
The maximum contract value will be recalculated to equal the contact value on the date of the covered life change.

If the oldest covered life after the change is greater than the age limitation of the rider at the time of the change, then the rider will terminate, and the death benefit will be equal to the contract value. If the rider is no longer available for sale and the issue age of the rider has been changed (to be determined on a non-discriminatory basis), and a covered life change occurs, and they exceed that newly determined age limitation, then the rider will terminate, and the death benefit will be equal to the contract value.

Joint/Spousal Continuation Election:

After the first 6 months of the contract issue date, if the owner and owner's spouse are no longer married for reasons other than death, then covered life changes may occur as follows:

If surrenders have not been taken from the contract, then the PB, the DB and the MCV remain the same; the covered life will be reset and the WP scale will be based on the youngest covered life as of the date of the change. Owner may remove owner's spouse as a covered life. Owner may replace owner's original spouse with owner's new spouse. These changes do not have to happen on the same day.

If surrenders have been taken from the contract, then owner may remove owner's spouse. The PB, the DB and the MCV remain the same; the WP scale will be based on the attained age of the remaining covered life as of the date of the change. Any changes other than removing the spouse will follow the rules below.

If the oldest covered life after the change is greater (older) than the age limitation of the rider at the time of the change, then the rider will terminate. The death benefit will be equal to the contract value.

If any other contractual change causes a change in the covered life, then either will automatically apply:
If the oldest covered life after the change is equal to or less (younger) than the age limitation of the rider at the time of the change, then the withdrawal feature of this rider will be revoked. The existing rider will continue with respect to the death benefit only. The rider charge is assessed on the revocation date, and then will no longer be assessed.
If the oldest covered life after the change is greater (older) than the age limitation of the rider at the time of the change, then the rider will terminate. The death benefit will be equal to the contract value.

If the rider is no longer available for sale and the issue age of the rider is changed (to be determined on a non-discriminatory basis), and a covered life change occurs, and they exceed that newly determined age limitation, then the rider will terminate, and the death benefit will be equal to the contract value.

If the spouse dies and is the primary beneficiary and the covered life, then the owner may remove the spouse from the contract. The PB, DB and the maximum contract value will remain the same. The WP will be recalculated as follows:

If there has been a partial surrender since the rider effective date, then WP will remain at the current percentage.

If there has not been a partial surrender since the rider effective date, then WP will be based on the attained age of the remaining covered life on the contract anniversary prior to the first surrender.

Spousal Continuation

Single Life Election:

In the event the contract owner dies and spousal continuation is elected, the contract value will increase to the DB value (the greater of the contract value and the DB). The covered life will be re-determined on the date of the continuation. If the covered life is less than age 81 (or other predetermined age) at the time of the continuation, then either of the below will automatically apply:

If the rider is not currently available for sale, the withdrawal feature of the rider will be revoked. The existing rider will continue with respect to the death benefit only. The rider charge is not assessed on the revocation date, and then is no longer assessed.

If the rider is currently available for sale, the existing rider will continue with respect to all benefits at the current rider charge.

The payment base and the death benefit will be set equal to the contract value on the continuation date. The LBP and WP will be recalculated on the continuation date. The WP will be recalculated based on the age of the oldest covered life on the effective date of the spousal continuation. If the WP had previously been locked in, then it will become unlocked and can change based on the next withdrawal. The maximum contract value will be set to the contract value on the continuation date. If the covered life is greater than or equal to age 81 (or other predetermined age) at the time of the continuation, the rider will terminate. The death benefit will be equal to the contract value.

Joint/Spousal Continuation Election:

In the event that the contract owner dies and spousal continuation is elected, the contract value will increase to the DB value (the greater of the contract value and the DB). The spouse may do the following.

The spouse may elect to continue the existing rider with respect to all benefits, at the current contract rider charge. The payment base will be equal to the greater of the contract value or the payment base on the continuation date. The LBP will be recalculated to equal the withdrawal percent multiplied by the greater of the contract value or the payment base on the continuation date. The maximum contract value will be the greater of the payment base or the contract value on the continuation date. The DB will be equal to the bumped up contract value on the continuation date.

The WP recalculation rule is as follows:

The WP will remain at the current percentage if there has been a partial surrender since the rider effective date.

If there has not been a partial surrender, the WP will be based on the attained age of the remaining covered life on the contract anniversary prior to the first surrender/withdrawal.

The contract owner cannot name a new owner on the contract. The contract owner can name a new beneficiary on the contract. Any new beneficiary added to the contract will not be taken into consideration as a covered life. The rider will terminate upon the death of the surviving covered life.

Alternatively, the spouse can elect to continue the contract and revoke the withdrawal feature of the rider. The charge is assessed on the revocation date, and then is no longer assessed.

The covered life will be re-determined on the date of the continuation date for death benefit purposes. If the covered life is greater than the age limitation at the time of continuation, the rider will terminate. The death benefit will be equal to the contract value.

Effect of Death of the Owner or the Annuitant Before the Annuity Commencement Date The following tables describe the effect of death of the owner or the annuitant before the annuity commencement date for the single life election and the joint/spousal continuation election.

TABLE 1

| Single Life Election: | | | |
| --- | --- | --- | --- |
| If the Deceased is | And . . . | And . . . | Then the . . . |
| Contract Owner | There is a surviving contract owner | The annuitant is living or deceased | Joint contract owner receives the DB, rider terminates |
| Contract Owner | There is no surviving contract owner | The annuitant is living or deceased | Rider terminates, designated beneficiary receives DB |
| Contract Owner | There is no surviving contract owner or beneficiary | The annuitant is living or deceased | Rider terminates, estate receives DB |
| Annuitant | Contract owner is living | There is no contingent annuitant and the contract owner becomes the contingent annuitant | Contract continues, no DB is paid, rider continues |
| Annuitant | Contract owner is living | There is no contingent annuitant and the contract owner waives their right to become the contingent annuitant | Rider terminates, contract owner receives DB |

TABLE 1-continued

Single Life Election:

| If the Deceased is | And... | And... | Then the... |
|---|---|---|---|
| Annuitant | Contract owner is living | Contingent annuitant is living | Contingent annuitant becomes annuitant and the contract and rider continues |
| Annuitant | Contract owner is non-natural person | There is no contingent annuitant | Contract owner receives DB, rider terminates |

Contingent Annuitant becomes Annuitant

If the annuitant dies where there is a contingent annuitant (who is different from the owner/annuitant), then the rider continues and all provisions of the rider remain the same, there are no resets nor DBs paid. Upon the death of the last surviving covered life, a DB is paid to the beneficiary, and the rider terminates.

Table 2: Joint/Spousal Continuation Election:

TABLE 2

Joint/Spousal Continuation Election:

| If the Deceased is... | And... | And... | Then the... |
|---|---|---|---|
| Contract Owner | There is a surviving contract owner | The annuitant is living or deceased | The surviving contract owner continues the contract and rider, the contract value increases to the death benefit value. |
| Contract Owner | There is no surviving contract owner | The annuitant is living or deceased | If the spouse is the sole primary beneficiary, follow spousal continuation rules for joint life elections |
| Contract Owner | There is no surviving contract owner or beneficiary | The annuitant is living or deceased | Rider terminates, estate receives DB |
| Annuitant | Contract owner is non-natural person | | If the spouse is the sole primary beneficiary, follow spousal continuation rules for joint life elections |
| Annuitant | The owner is living | There is a living contingent annuitant | The rider continues; upon the death of the last surviving covered life, the rider will terminate. |

Effect of Death After the Annuity Commencement Date.

The following tables describe the effect of death after the annuity commencement date for single life election and joint/spousal continuation election.

TABLE 3

Single Life Election:

| If the Deceased is | And... | And... | Then the... |
|---|---|---|---|
| Annuitant | The annuitant is also the contract owner | Fixed lifetime and period certain is elected | The lifetime contingency ceases. The remaining DB is paid under period certain. |

TABLE 4

Joint/Spousal Continuation Election:

| If the Deceased is... | And... | And... | Then the... |
|---|---|---|---|
| Annuitant | The annuitant is also the contract owner, and there is no surviving joint annuitant | Fixed lifetime and period certain is elected | The lifetime benefit ceases. The remaining DB is paid under period certain. |
| Annuitant | The annuitant is also the contract owner, and there is a surviving joint annuitant | Fixed joint and survivor lifetime and period certain is elected | Lifetime benefit continues until death of last surviving annuitant |

Rider Charge

Rider charge is equal to (Option 1—30 bps; Option 2—40 bps; or other formula) multiplied by the Payment Base on each contract anniversary. The Contract Anniversary Date is the day of the anniversary, all processing after the end of the trade date. However, other methodologies could be used. The following is the possible order of transactions. Other orders of transactions are possible.

First—all other financial transactions.
Second—Take the AMF.
Third—Calculate PB increase (Option 2).
Fourth—Take the Rider Charge.

If the Contract Value on the Contract Anniversary Date is less than or equal to the MCV, the AMF and Rider Charge are waived.

In case of total surrender, a pro rata share of the Rider charge is equal to the Rider charge percentage multiplied by the PB, multiplied by the number of days since the last contract anniversary (not to exceed 365 days), divided by 365. If the Rider effective date is after the Contract Issue date, the period between the Rider effective date and the next contract anniversary will constitute a contract year. The prorated charge will be assessed for this Contract Year. The Rider charge is withdrawn from each investment option in the same proportion that the value of the investment option bears to the Contract Value, which includes all investment options, including the Fixed Accumulation Feature. However, it does not include the DCA Plus feature. Any money in the DCA Plus feature is deducted from the contract value for purposes of determining the proportional value of each investment option.

If a surrender is taken on any other date other than the contract anniversary and such surrender causes the total surrenders during the year to exceed the LBP and reduces the contract value to below the minimum account rules in affect on the valuation day of the surrender, a pro rate share of the Rider charge will be deducted from the amount otherwise payable.

The minimum amount does not include the rider fee. The rider fee is not taken if the surrender amount is within the annual LBP. The Rider charge will be discontinued once an Annuity Option available under the contract or Rider becomes effective. The Rider charge may be limited on fixed accounts based on state specific regulations. The Rider charge for new issue only may increase or decrease up to a predetermined maximum charge percentage at anytime (e.g. 0.75%). The Rider charge will only increase on Riders eligible for future benefit increase. However, no charge increase will apply once the Covered Life reaches age 80 (or other predetermined age).

If the Rider charge increases, the contract owner has the following options:

Accept the rider charge increase and continue to receive automatic PB increases at contract anniversary;
Decline the charge increase and no longer receive automatic PB increases at contract anniversary.

If the contract owner denies the charge increase, they will not be able to accept the charge increase at a later date. A different rider charge depending on the participation in approved investment options may be charged.

Fund Allocation Restrictions

Fund allocation and investment in any investment option may be restricted in the event of a change of covered life after six months. If the investment option restriction is imposed, a contract owner (may) have the following options. The contract owner may (i) reallocate all existing money and all new premiums to a non-restricted investment option, an available asset allocation program, or fund-of-fund investment option from time to time, or (ii) the contract owner may revoke the withdrawal feature. If the restrictions are violated, the withdrawal feature will be revoked. The death benefit continues as is upon the date of revocation.

Aggregation.

For purposes of determining the PB under the rider, one or more deferred variable annuity contracts issued to the owner with the rider attached in the same calendar year may be treated as one contract. If the contracts are aggregated, the period over which withdrawals are measured against the payment benefit will change.

The effective date of the election until the end of the calendar year will be treated as a contract year for the purposes of the LBP limit. A pro rata rider charge will be taken at the end of that calendar year. As long as total withdrawals in that period do not exceed the LBP, the withdrawals will not necessitate a reset.

In future calendar years, the LBP limits will be aggregated and will be on a calendar year basis. In other words, withdrawals under all aggregated contracts in a calendar year will be compared against the combined LBP limits for the aggregated contracts. If withdrawals exceed those combined limits, the aggregate PB will be set to the combined contract values of the aggregated contracts. The LBP will then equal the withdrawal percent multiplied by the new PB.

If withdrawals do not exceed those combined limits, each withdrawal will reduce the PB dollar for dollar. The withdrawal benefits relating to the contract value reaching zero will not apply until the contract value of all aggregated contracts reaches zero. The rider charge will be taken at the end of each calendar year. It will be deducted pro rata from all of the sub-accounts and fixed accounts of the aggregated contracts. If the contract values of all aggregated contracts are reduced below the minimum account rules in effect, the annuity options as defined earlier in this specification will be offered. The options will pay the combined LBP.

Annuity Commencement Date.

If the annuity reaches the maximum ACD, which is the later of the $10^{th}$ contract anniversary and the date the annuitant reaches age 90, the contract must be annuitized unless it is agreed upon to extend the ACD. In this circumstance, the contract may be annuitized under standard annuitization rules, but under no circumstances will the amount payable be less than your LBP, provided that the certain period does not exceed the death benefit remaining at the ACD divided by the LBP.

Single Life Election:

A fixed lifetime and period certain payout will be issued. The lifetime portion will be based on the covered life determined at the ACD. The covered life is the annuitant for this payout option. If there is more than one covered life then the lifetime portion will be based on both covered lives. The covered lives will be the annuitant and joint annuitant for this payout option. The lifetime portion will terminate on the first death of the two. The minimum amount paid under this annuity option will at least equal the remaining DB under this rider.

If the oldest annuitant is age 59 (or other predetermined age) or younger, the date the payments begin will be automatically deferred until the oldest annuitant attains age 60 (or other predetermined age) and is eligible to receive payments in a fixed dollar amount until the later of the death of any annuitant or a minimum number of years. If the annuitant(s) are alive and age 60 (or other predetermined age) or older, payments will be received in a fixed dollar amount until the later of the death of any annuitant or a minimum number of years. The minimum number of years that payments will be made is equal to the remaining DB under this rider divided by the product of the payment base on the ACD multiplied by the greater of the WP and 5% single (4½% joint/spousal).

$$\text{Single Election: } \frac{DB}{PB \times \text{Max}(WP, 5\%)}$$

$$\text{Joint/Spousal Election: } \frac{DB}{PB \times \text{Max}\left(WP, 4\frac{1}{2}\%\right)}$$

This annualized amount will be paid over the greater of the minimum number of years, or until the death of any annuitant, in the frequency that is elected. The frequencies will be among those offered by the issuing company at that time but will be no less frequently than annually. If, at the death of any annuitant, payments have been made for less than the minimum number of years, the remaining scheduled period certain payments will be made to the beneficiary. A lump sum option is not available.

Joint/Spousal Continuation Election:

The minimum amount paid to the annuitant under this annuity option will at least equal the DB under the rider. If the younger annuitant is alive and age 59 (or other predetermined age) or younger, the date that payments begin will be automatically deferred until the younger annuitant attains age 60 (or other predetermined age) and is eligible to receive payments in a fixed dollar amount until the death of the last surviving annuitant or a minimum number of years. If the annuitants are alive and the younger annuitant is age 60 or older (or other predetermined age), payments will be received in a fixed dollar amount until the death of the last surviving annuitant or a minimum number of years. The minimum number of years that payments will be made is equal to the remaining DB under this rider divided by the LBP at annuitization.

This annualized amount will be paid over the greater of the minimum number of years, or until the death of the last surviving annuitant, in the frequency that annuitant elects. The frequencies will be among those offered at that time but will be no less frequently than annually. If, at the death of the last surviving annuitant, payments have been made for less than the minimum number of years, the remaining scheduled period certain payments will be made to the beneficiary. A lump sum option is not available. If both spouses are alive, a fixed joint and survivor lifetime and period certain payout will be issued. The covered life and covered life's spouse will be the annuitant and joint annuitant for this payout option. The lifetime benefit will terminate on the last death of the two. If one spouse is alive, owner will be issued a fixed lifetime and period certain payout. The lifetime portion will be based on the covered life. The covered life is the annuitant for this payout option. The lifetime benefit will terminate on the last death of the covered life.

Revoking the Withdrawal Feature
Benefit Option 1

At any time following the earlier of spousal continuation or fifth anniversary of the rider effective date, the contract owner may elect to revoke the withdrawal feature of the rider. The payment base will go to zero and the withdrawal percent will go to zero, and LBP will go to zero.

On the date the withdrawal feature is revoked, a pro rata share of the rider charge is equal to the rider charge percentage multiplied by the PB, multiplied by the number days since the last charge was assessed, divided by three-hundred and sixty-five (365). The rider charge will be assessed on the revocation date, and then will no longer be assessed. The death benefit continues as is upon the date of the revocation. No other living benefit may be elected upon the revocation of the withdrawal feature.

Benefit Option 2

The contract owner can not elect to revoke the withdrawal feature. However, the withdrawal feature can be revoked in certain circumstances. See specific sections on ownership and spousal continuation.

Additional Annuity Contract(s) Rules

Additional terms of the contract(s) or rider(s) include the following. The benefits under the contract cannot be assigned. If the free look provision under the contract is exercised, the rider will terminate. The employee gross-up is not considered premium for purposes of the payment base and death benefit. Payment enhancements are not considered premium for purposes of the payment base and death benefit. Front-end loads are not taken from the premium for purposes of the payment base and death benefit.

Subject to state approval, a rider will be made available on all currently available products issued on or after the date the rider is launched for sale in the state of issue. This does not imply post-issue election. Post-issue election will be determined on an as needed basis. See product requirements for a complete list.

Prior company approval is required on all subsequent premium payments received after the first twelve (12) months. Any subsequent premium payment(s) which brings the total cumulative subsequent premiums in excess of $100,000 will not be accepted without prior approval. Payment enhancements and employee gross-up are not to be included in premium total.

Where post-issue election occurs, if the rider effective date is after the contract issue date, then the period between the rider effective date and the next contract anniversary will constitute a contract year.

It should be understood that as used herein the term "periodically" in certain aspects may refer to only being performed once. In other aspects, "periodically" may refer to steps being performed more than once as described herein.

Turning now to the figures, FIG. 1 illustrates the manner in which a new annuity contract application is processed. The new application processing routine starts (block 102) when an application is completed. The annuity contract application and initial premium are received by the insurance company (block 104). The annuity contract is then established through the contract establishing routine (block 106) as further described in FIG. 2. After the annuity contract is established, the account value is then set up through the account value set up routine (block 108), via the computer systems, as further specified in FIG. 3. Thereafter customer communication is established through the customer communication routine (block 110) as further specified in FIG. 4. The application processing routine ends at (block 112).

Figure 2:
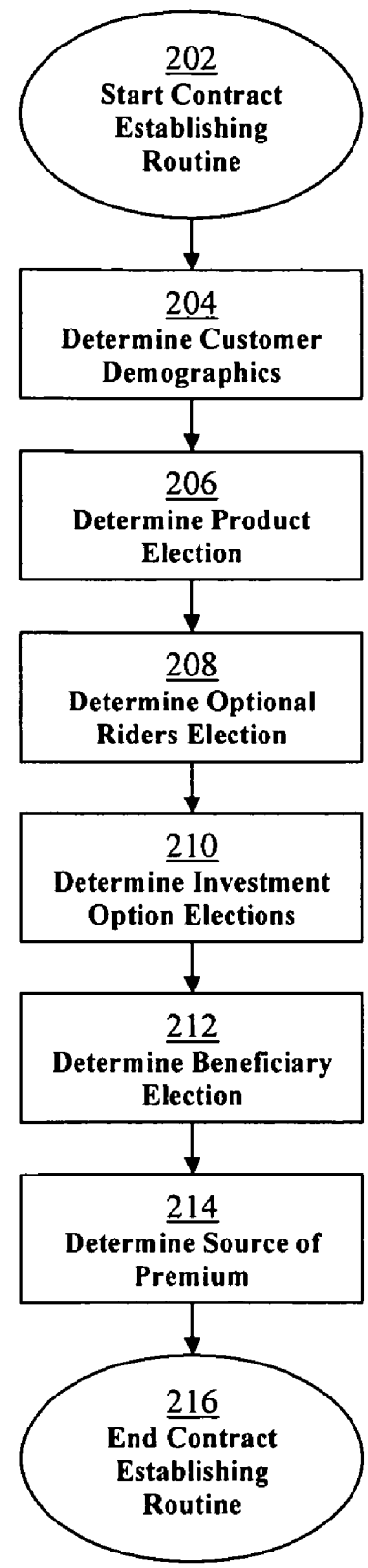
FIG. 2 is a flow chart that illustrates in more detail the manner in which an annuity contract is established.

FIG. 2 is a flow chart that illustrates in more detail the manner in which an annuity contract is established. The annuity contract establishing routine starts at (block 202). After receiving the annuity contract application, customer demographics are determined (block 204). The customer demographics and other data from the annuity contract application are transmitted to the insurance company by any suitable means, such as electronic transmission, facsimile transmission, telephonic transmission, and the like. The customer demographics may be scanned in or electronically entered into the computer system by the insurance company after the demographic data is determined. Such demographic information may include age, gender, date of birth, social security number, address, marital status, and the like. The customer demographics may be used for a variety of purposes, such as identification purposes or to locate a relevant life by searching his/her social security number. The customer demographics are also used when determining and/or calculating a variety of factors that are related to the annuity contract, such as benefit amount calculations, tax considerations, and the like. The types of customer demographics that are determined are generally related to the type of annuity contract application that is filled out by the relevant life. The specific product election is determined (block 206). For example, the specific product may be elected from a group of different variable annuity products which each have different characteristics including the costs and fees as well as the liquidity features associated therewith. The election of optional riders is determined (block 208). For example, the optional riders may be elected from a group of different riders which each have various guaranteed withdrawal features. The election of investment options is determined (block 210). For example, the investment options include money market funds, bond funds, stock funds, and the like. The beneficiary is elected (block 212). In one aspect, this is the person who will collect the death benefits, if any. The source of the premium is determined (block 214). For example, the source of the premium may come from the relevant life's personal funds or may come from another annuity in the form of a transfer. It should be understood that the steps taken for establishing the contract may proceed in various orders and that the order shown in FIG. 2 is for illustrative purposes only and is only one embodiment of said steps. The contract establishing routine ends at (block 216).

Figure 3:
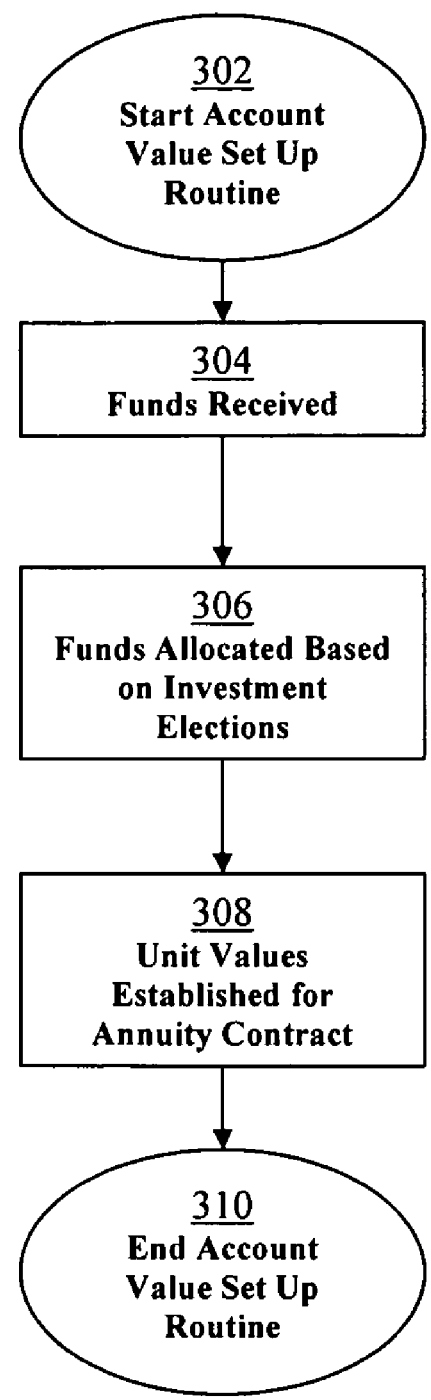
FIG. 3 is a flow chart that illustrates in more detail the manner in which an account value is set up.

FIG. 3 is a flow chart that illustrates in more detail the manner in which an account value is set up. The account value set up routine starts at (block 302). The funds are received (block 304). For example, the funds may be received via electronic transfer from a bank account or from another variable annuity holder. The funds are then allocated based on investment elections (block 306). For example, the allocations can be accomplished through a computerized system according to the investment elections by the relevant life. Unit values are established for the annuity contract (block 308). For example, based on the performance of the underlying investment elections, unit values are established, preferably on a daily basis, for use in determining the resulting impact on the relevant life's annuity contract based on their specific fund allocations. For example the number of units that are applied to each annuity contract is different for each relevant life based on the number of units held within the annuity contract. It should be understood that the steps taken for setting up the account value may proceed in various orders and that the order shown in FIG. 3 is for illustrative purposes only and is only one embodiment of said steps. The account value set up routine ends at (block 310).

Figure 4:
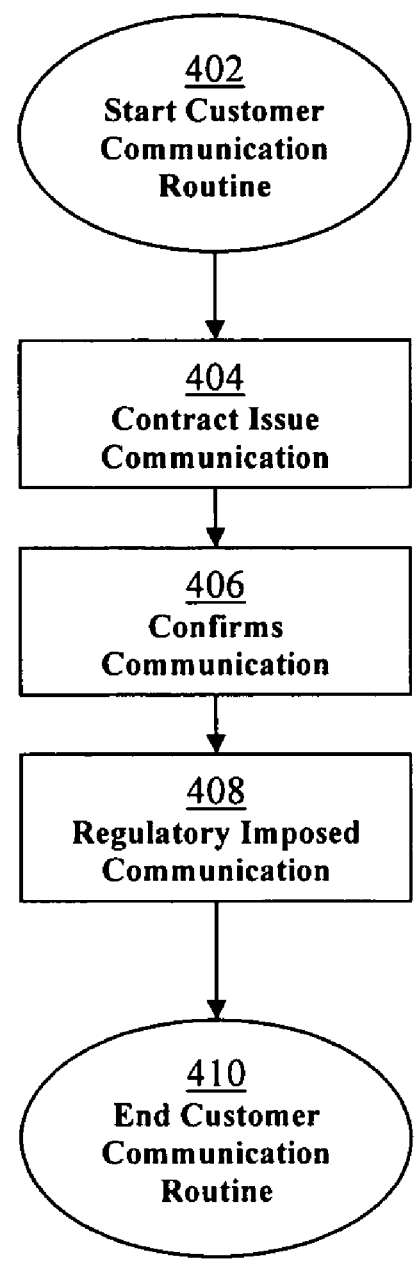
FIG. 4 is a flow chart that illustrates in more detail the manner in which customer communication is established.

FIG. 4 is a flow chart that illustrates in more detail the manner in which customer communication is established. The customer communication routine starts at (block 402). Communications with the customer may be accomplished via email, facsimile, letter, telephone, and the like. Communication with the customer in one aspect relates to the issuing of the contract (block 404). Communication with the customer in one aspect relates to the relevant confirmation of the previous contract issuance communication (block 406). Any regulatory-imposed communication with the client is accomplished (block 408). It should be understood that the steps taken for establishing customer communication may proceed in various orders and that the order shown in FIG. 4 is for illustrative purposes only and is only one embodiment of said steps. The customer communication routine ends at (block 410).

Figure 5:
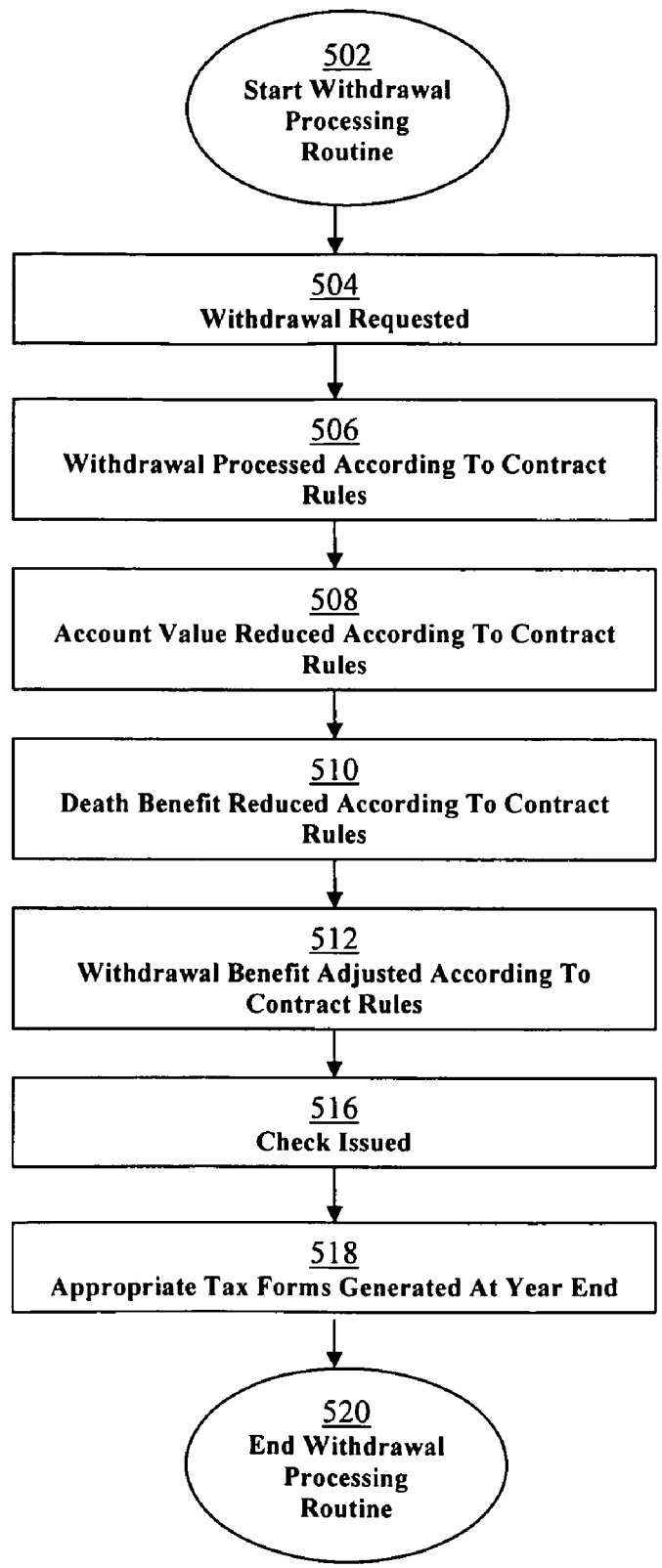
FIG. 5 is a flow chart illustrating the appropriate steps after a withdrawal is requested.

FIG. 5 is a flow chart illustrating the appropriate steps after a withdrawal is requested. The withdrawal processing routine starts at (block 502). A withdrawal is first requested by the relevant life at (block 504). The withdrawal is then processed according to the contract rules (block 506). The contract rules are embedded in a computer system or the like and vary according to the type of annuity contract. For example, in certain embodiments, a requested withdrawal amount by the relevant life may be limited by the contract rules to a specific withdrawal percent that is applied by the computer system, and wherein the contract rules specify the withdrawal percent according to the age of the relevant life or the number of years since the contract was established. Therefore, the contract rules govern the data flow in the computer system. The contract rules are administratively built into the computer system to obviate the need for manual intervention by the insurance company. The account value is reduced according to the contract rules (block 508). The death benefit is reduced according to the contract rules (block 510). The withdrawal benefit is adjusted according to the contract rules (block 512). The check or other form of payment is issued (block 516). The appropriate tax forms are generated at year end (block 518). It should be understood that the steps taken for processing withdrawals may proceed in various orders and that the order shown in FIG. 5 is for illustrative purposes only and is only one embodiment of said steps. The withdrawal processing routine ends at (block 520).

Figure 6:
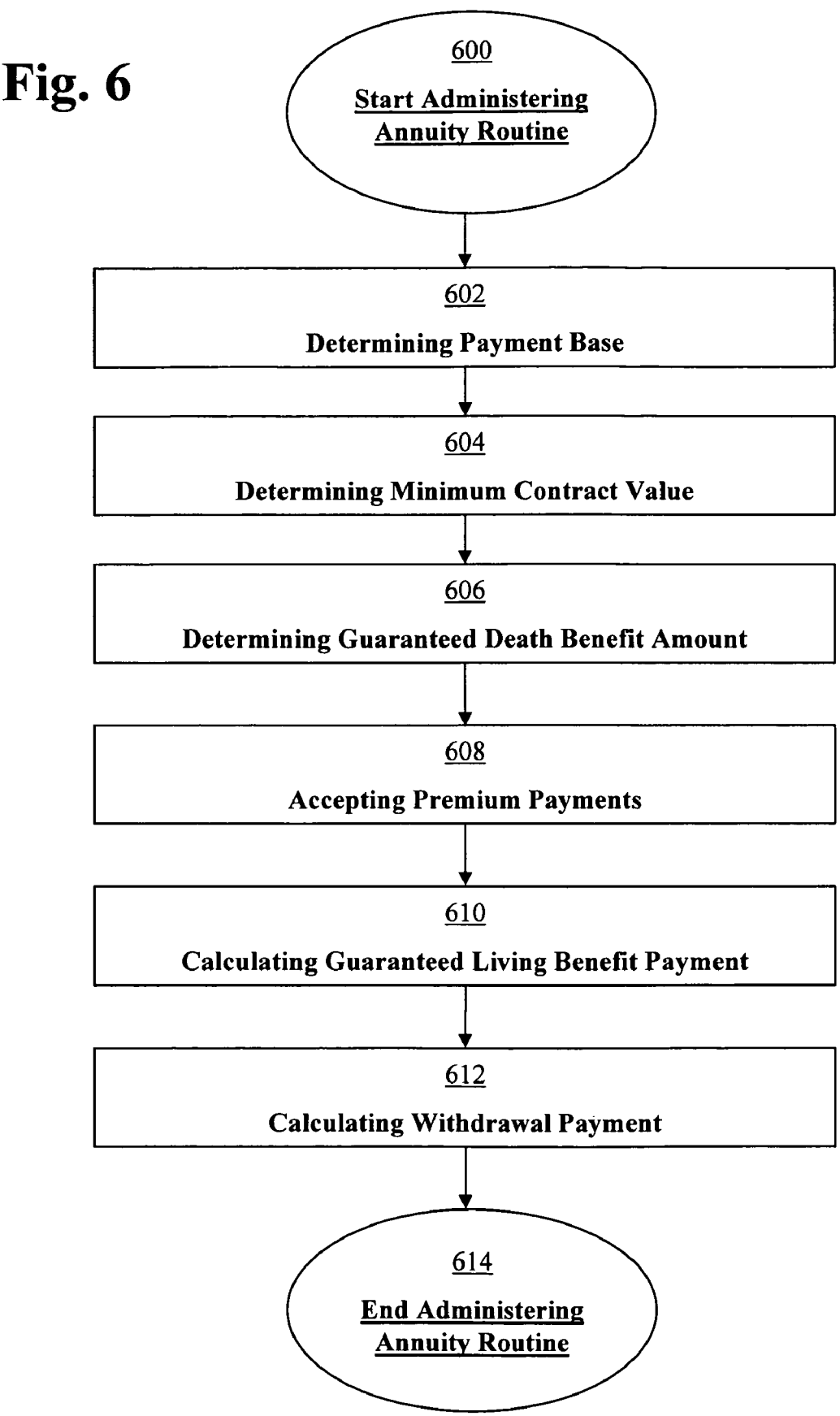
FIG. 6 is a flow chart illustrating a preferred embodiment of the present invention comprising a data processing method for administering an annuity contract for a relevant life.

FIG. 6 is a flow chart illustrating a preferred embodiment of the present invention comprising a data processing method for administering an annuity contract. It should be understood that the order of the successive method steps is shown for the sake of illustrating but one example and that the order of method steps can proceed in any variety of orders. In one embodiment of the present invention, the invention comprises a data processing method for administering an annuity contract for a relevant life, the annuity contract having a contract value and a guarantee of lifetime benefit payments and a minimum contract value. The present method begins at (block 600). The present method determines a payment base for said annuity contract (block 602) that is a function of the previous premium payments and withdrawals by the relevant life. The present method determines a minimum contract value (MCV) for the annuity contract (block 604). The present method determines a guaranteed death benefit amount (block 606). As described below, the guaranteed death benefit amount can change during the accumulation period. If requested by the relevant life, the present method periodically accepts premium payments from the relevant life (block 608), which increase the payment base, the guaranteed death benefit, and the contract value.

If requested by the relevant life and the covered life is older than a predetermined age (i.e. 60 years old), the present method periodically calculates a guaranteed lifetime benefit payment for the relevant life (block 610) which decreases both the contract value and the guaranteed death benefit amount, but will not decrease the contract value below the minimum contract value. If requested by the relevant life, the present method periodically calculates a withdrawal payment (block 612) that is in excess of the lifetime benefit payment for the relevant life, which decreases each of: the contract value, the payment base, and the death benefit amount, and can decrease the contract value below the minimum contract value.

It should be understood that several of the method steps of the present invention (for example blocks 602 and 604) require a computer to use the method of the present invention; that is to say the calculations and appropriate data records must be accomplished by a computer. For example, in one embodiment of the present invention, the payment base is related to premium payments by the relevant life, wherein some of the premium payments may be determined by calculations according to the present invention. A computer receives the payments and processes the appropriate calculations. In one embodiment, the minimum contract value is dependent on a pre-selected percentage selected by the issuer issuing the annuity and/or the relevant life. Preferably, the pre-selected percentage is fixed and is set by the issuer issuing the annuity. Additionally, the withdrawal percent is preferably based on the age of the relevant life at the time of the first requested lifetime benefit payment. The annuity commencement date is established according to pre-established rules, subject to certain restrictions. The initial guaranteed death benefit amount is determined by calculations according to the present invention. Preferably, the initial guaranteed death benefit amount is established for calculation purposes. In a preferred embodiment, the initial guaranteed death benefit amount is equal to the payment base. The administration of the annuity contract ends at (block 614).

Figure 7:
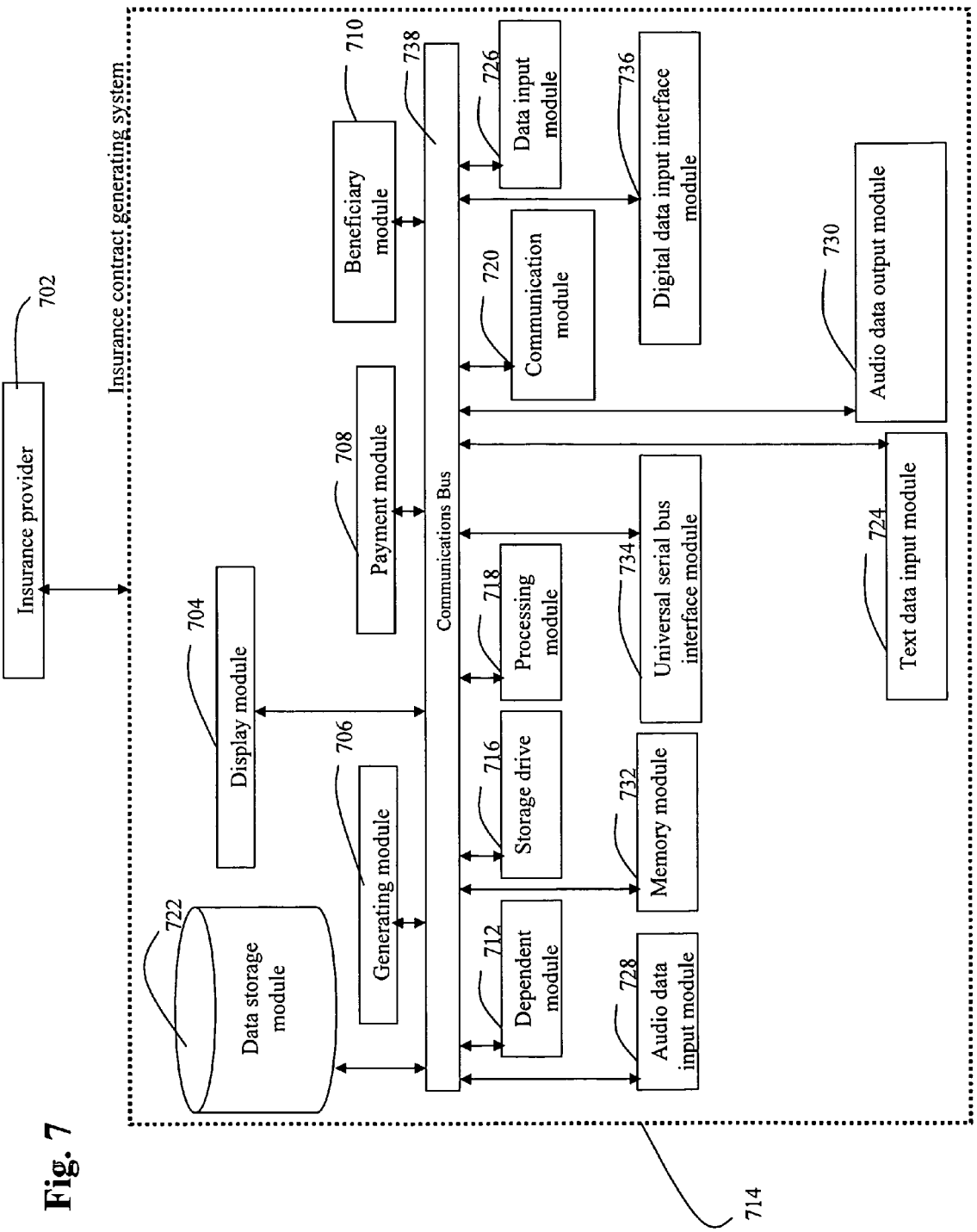
FIG. 7 is a diagram illustrating the system on which the present invention is implemented in accordance with an embodiment of the present invention.

Referring next to FIG. 7, depicted is a preferred embodiment of a system on which the methods of the present invention may be implemented. In one example of the preferred embodiment, the insurance contract generating system 714 would generally be used by an insurance provider 702, however the system may be operated by any individual or organization offering an insurance product as outlined in the present specification without departing from the spirit of the present invention. System 714 may be implemented in many different ways such as part of a single standalone server or as a network server or servers which may be distributed across multiple computing systems and architectures. Preferably, the central processing computer or network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server.

The network server may also be configured in a distributed architecture, wherein the server components or modules are housed in separate units or locations. Each of the modules described may be implemented as single servers or one or more or all of the modules may be incorporated into a single server. These servers will perform primary processing functions and contain at a minimum, a RAM, a ROM, and a general controller or processor. In such an embodiment, each server is connected to a communications hub or port that serves as a primary communication link with other servers, clients or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

In the preferred embodiment, all of the modules described herein are operably inter-connected via a central communications bus 738. The communications bus 738 is able to receive information from each of the modules, as well as to transmit information from one module to another. The insurance contract generating system 714 further includes a display module 704, and a generating module 706. The generating module is used for generating an insurance contract, wherein the insurance contract provides coverage to an individual or group for at least one event defined in the insurance contract.

The insurance contract generating system 714 additionally includes a payment module 708 for making payments to an insured individual or group for a predetermined period of time as defined by the deferred annuity insurance contract.

The system further comprises a beneficiary module 710 for choosing a beneficiary to receive payments from the insurance provider in the instance of an insured individual's death. Furthermore, the system comprises a dependent module 712 for offering an insurance contract structured according to the methods of the present invention to dependents of an individual eligible for the insurance contract described herein.

Additionally, the insurance contract generating system 714 includes: a storage drive 716 for receiving data stored on a storage disc, a processing module 718 for processing digital data received by and contained in the insurance contract generating system 714, a communication module 720 for bi-directional communication with external and telecommunications systems, a data storage module 722 for storing and managing digital information, a text data input module 724 for inputting data in the form of text, and a data input module 726 for converting to digital format documents and images and inputting them into the insurance contract generating system 714.

Finally, the insurance contract generating system 714 includes: an audio data input module 728 for receiving and inputting audio information, an audio data output module 730 for outputting data in audio format (i.e. recorded speech, synthetically generated speech from digital text, etc), a memory module 732 for temporarily storing information as it is being processed by the processing module 718, a universal serial bus interface module 734 for receiving and transmitting data to and from devices capable of establishing a universal serial bus connection, and a digital data input interface module 736 for receiving data contained in digital storage devices.

Data storage device may include a hard magnetic disk drive, tape, optical storage units, CD-ROM drives, or flash memory. Such data storage devices generally contain databases used in processing transactions and/or calculations in accordance with the present invention. In one embodiment, the database software creates and manages these databases. Insurance-related calculations and/or algorithms of the present invention are stored in storage device and executed by the CPU.

The data storage device may also store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, and each record includes fields that are specific to the present invention such as interest rates, contract value, payment base value, step up percent, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing a deferred annuity insurance contract to an individual, generating a deferred annuity insurance contract, and making payments to the individual as defined in the deferred annuity insurance contract. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

For example, a user provides instructions for the amount of the lifetime benefit payment that is requested. It should be understood that the user may communicate with the computing system directly or indirectly through another party, such as the insurance provider 702. In the event the user communicates with an insurance provider 702, the insurance provider 702 than receives and transfers information, to and from the insurance contract generating system 714 via the text data input module 724, audio data input module 728, audio data output module 730 and the display module 704. As used herein the data storage module 722 is also referred to as a storage device. The processing module 718 is contained within the insurance contract generating system 714, which is coupled to the storage device, the storage device stores instructions that are utilized by the processor. The instructions comprise: (i) an instruction for determining a present payment base; (ii) an instruction for determining a present contract value; (iii) an instruction for determining a minimum contract value; and (iv) an instruction for calculating a lifetime benefit payment; wherein the lifetime benefit payment withdrawal is determined according to one of the following formulas:

Lifetime Benefit Payment (LBP) withdrawal=(the payment base)×(the withdrawal percent);

Lifetime Benefit Payment (LBP) withdrawal=(the total premium)×(the withdrawal percent);

Or LBP=the greater of:

"the guaranteed lifetime benefit payment"−(the Payment Base)×(the Withdrawal Percent); and "the maximum lifetime benefit payment"−(the present Contract Value)×(the Withdrawal Percent).

The following description and examples further illustrate the preferred features of the present invention.

The "Minimum Contract Value" is defined as a predetermined percentage [i.e. 20%] of your Payment Base on the date of a withdrawal request. Lifetime Benefit Payment (LBP) withdrawals cannot reduce the Contract Value below this minimum threshold. Only sub-account performance and withdrawals in excess of the LBP can decrease the Contract Value below the Minimum Contract Value. For example, if the Payment Base is $100,000, the Minimum Contract Value is equal to $20,000 (20% of $100,000).

Each time a Lifetime Benefit Payment withdrawal request is received, a test will be performed on the Contract Value to determine if it is below the Minimum Contract Value or would drop below the Minimum Contract Value due to the requested LBP. If a requested Lifetime Benefit Payment would drop the Contract Value below the Minimum Contract Value, the Contract Value will be liquidated to pay the LBP only to the extent it would equal the Minimum Contract Value. The remaining portion of the LBP that is not funded by the Contract Value will be paid out of the General Account assets of the company. The Guaranteed Death Benefit is reduced by the full amount of the LBP regardless of whether the LBP is paid from the Contract Value or the General Account of the company. See Example 1 below.

EXAMPLE 1

LBP withdrawal request=$5,000
Current Contract Value=$23,000

Minimum Contract Value=$20,000
Guaranteed Death Benefit=$20,000
In this situation, the $5,000 request would drop the Contract Value to $18,000 if it were to be paid entirely from the Contract Value, which is lower than the Minimum Contract Value. Therefore, the Contract Value will only drop to the Minimum Contract Value of $20,000, and the remaining $2,000 will be funded by the General Account assets of the company.
Therefore, the request will be processed as follows:
  LBP paid=$5,000
  New Contract Value=$20,000 (equals the Minimum Contract Value)
  New Guaranteed Death Benefit=$15,000 ($20,000 minus the $5,000 LBP)
  At death, the Death Benefit would be the greater of the Contract Value and the Guaranteed Death Benefit, which in this case would be $20,000
  Amount paid from the Contract Value=$3,000 (reduces the Contract Value to the Minimum Contract Value)
  Amount paid from the General Account of the company=$2,000 (the difference between the LBP and the amount paid out from the Contract Value)
If the Contract Value is below the Minimum Contract Value on the date of the requested LBP, the LBP will be paid entirely out of the General Account assets of the company, and the Contract Value will not be reduced. See Example 2 below.

EXAMPLE 2

LBP withdrawal request=$5,000
Current Contract Value=$10,000
Minimum Contract Value=$20,000
Guaranteed Death Benefit=$4,000
The request will be processed as follows:
  LBP paid=$5,000
  New Contract Value=$10,000
  New Guaranteed Death Benefit=$0
  At death, the Death Benefit would be the greater of the Contract Value and the Guaranteed Death Benefit, which in this case would be $10,000
  Note the Guaranteed Death Benefit is reduced by the amount of the LBP, and will not drop below $0.
If the withdrawal request is in excess of the LBP, then the Payment Base and the Death Benefit will all be proportionally reduced by the excess withdrawal amount. The Contract Value, even if it is below the Minimum Contract Value, will also be reduced by the amount of the excess withdrawal.
If applicable, the rider fee will not be collected if the Contract Value is equal to or less than the Minimum Contract Value on the Contract Anniversary. If the Contract Value on the Contract Anniversary is higher than the Minimum Contract Value, the rider fee would be assessed, but would never drop the Contract Value below the Minimum Contract Value. (For example, if the Contract Value is $20,100, the Minimum Contract Value is $20,000 and the rider fee is $400, only a $100 rider fee will be collected, and the remaining $300 will be waived.)
The AMF (Account Maintenance Fee) will not be collected if the Contract Value is equal to or less than the Minimum Contract Value on the Contract Anniversary. If the Contract Value on the Contract Anniversary is higher than the Minimum Contract Value, the AMF would be assessed, but would never drop the Contract Value below the Minimum Contract Value.
In addition, the account may be subject to M, E & A, 12 b-1 and fund level charges. These charges may or may not be assessed against the contract value if the contract value is below the minimum contract value.
Since the fees typically assessed against the contract are not collected if the Contract Value drops below the Minimum Contract Value, the Contract Value can never reduce to $0 unless the funds backing the sub-accounts become valueless or a full liquidation is taken.
The product will have a maximum Annuity Commencement Date which is the later of the $10^{th}$ contract anniversary and the date the annuitant reaches age 90. Asset-based trail commissions will continue to be paid until annuitization. If the total Contract Value is withdrawn, the contract will terminate.
Having thus described the invention in rather full detail, it will be understood that such detail need not be strictly adhered to, but that additional changes and modifications may suggest themselves to one skilled in the art, all falling within the scope of the invention as defined by the subjoined claims.
While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A data processing system for administering a deferred variable annuity contract during the accumulation phase, said system comprising:
  a communications module for receiving information for said deferred variable annuity contract;
  a data storage module coupled to said communications module for storing said received information;
  a processing module coupled to said date storage module for determining a minimum contract value, for determining a guaranteed death benefit amount and for determining a payment base, and wherein said guaranteed death benefit amount is not less than said minimum contract value; and
  a payment module coupled to said processing module for receiving periodic premium payments during said accumulation phase;
  said payment module being coupled to said provider for paying lifetime benefit payments during said accumulation phase, the lifetime benefit payments being available up to a maximum amount on a periodic basis during the accumulation phase for a lifetime of a relevant life;
  wherein said payment module provides excess withdrawal payments during said accumulation phase, and wherein said excess withdrawal payments are in excess of said lifetime benefit payments and may decrease said contract value below said minimum contract value; and
  wherein said lifetime benefit payments do not decrease said contract value below said minimum contract value, provided that no excess withdrawal payment has been made.

2. The data processing system of claim 1 wherein said payment module provides a death benefit amount upon a death of said relevant life.

3. The data processing system of claim 2, wherein said periodic premium payments increases said payment base, said guaranteed death benefit amount and a contract value.

4. The data processing system of claim 3, wherein said lifetime benefit payments paid to said relevant life decrease said contract value and said guaranteed death benefit amount and do not decrease said payment base.

5. The data processing system of claim 3, wherein said excess withdrawal payments decrease said contract value, said payment base and said guaranteed death benefit amount.

6. The data processing system of claim 2 wherein said death benefit amount is a greater of said guaranteed death benefit amount or said contract value.

7. The data processing system of claim 6 wherein said minimum contract value is a function of a predetermined withdrawal percentage and said payment base.

8. The data processing system of claim 6 wherein said minimum contract value is a function of a predetermined percentage and total premiums received.

9. The data processing system of claim 1 wherein said lifetime benefit payments is a function of said payment base and a withdrawal percentage, and wherein said withdrawal percentage is a function of age of a relevant life.

10. The data processing system of claim 1 wherein said periodic premium payments are received only if requested by a relevant life.

11. A data processing method for administering a deferred variable annuity contract during an accumulation phase, the method comprising the steps of:
   receiving, via a communications module, information for the deferred variable annuity contract;
   storing, via a data storage module, the received information;
   determining, via a processing module coupled to the data storage module, a minimum contract value;
   determining, via the processing module coupled to the data storage module, a guaranteed death benefit amount not less than the minimum contract value;
   determining, via the processing module coupled to the data storage module, a payment base;
   receiving, via a payment module coupled to the processing module, periodic premium payments during the accumulation phase;
   paying, via the payment module coupled to the processing module, lifetime benefit payments to a relevant life during the accumulation phase, the lifetime benefit payments being available up to a maximum amount on a periodic basis during the accumulation phase for a lifetime of the relevant life;
   paying, via the payment module coupled to the processing module, excess withdrawal payments to the relevant life during the accumulation phase, wherein said excess withdrawal payments are greater than the lifetime benefit payments and may decrease said contract value below said minimum contract value, and
   wherein said lifetime benefit payments do not decrease said contract value below said minimum contract value, provided that no excess withdrawal payment has been made.

12. The computer implemented method of claim 11 further comprising the step of paying, via the payment module, a death benefit upon a death of the relevant life.

13. The computer implemented method of claim 11 further comprising the step of increasing, via the processing module, the payment base when the periodic premium payments are received.

14. The computer implemented method of claim 11 further comprising the step of decreasing, via the processing module, the contract value and the guaranteed death benefit amount to an amount not less than the minimum contract value when the lifetime benefit payments are paid, provided that no excess withdrawal payment has been made.

15. The computer implemented method of claim 11 further comprising the step of decreasing, via the processing module, the payment base and the guaranteed death benefit amount when the excess withdrawal payments are paid.

16. The computer implemented method of claim 11 further comprising the step of decreasing, via the processing module, the contract value below the minimum contract value, wherein the contract value is decreased when the excess withdrawal payments are paid.

17. The computer implemented method of claim 16 wherein the death benefit amount is a greater of the guaranteed death benefit amount or the contract value.

18. The computer implemented method of claim 11 wherein the lifetime benefit payments is a function of the payment base and a withdrawal percentage, and wherein the withdrawal percentage is a function of age of the relevant life.

19. The computer implemented method of claim 18 wherein the minimum contract value is a function of a predetermined withdrawal percentage and the payment base.

20. The computer implemented method of claim 18 wherein the minimum contract value is a function of a predetermined percentage and total premiums.

21. The computer implemented method of claim 11 wherein the lifetime benefit payments are paid only if requested by the relevant life.

22. The computer implemented method of claim 11 wherein the excess withdrawal payments are made only if requested by the relevant life.

* * * * *